United States Patent
Asada et al.

(10) Patent No.: US 9,361,927 B2
(45) Date of Patent: Jun. 7, 2016

(54) OPTICAL PICKUP AND OPTICAL RECORDING AND REPRODUCING DEVICE

(71) Applicant: Panasonic Intellectual Property Management Co., Ltd., Osaka (JP)

(72) Inventors: Jun-ichi Asada, Hyogo (JP); Yuichi Takahashi, Nara (JP); Hiroaki Matsumiya, Osaka (JP); Kazuo Momoo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/650,139
(22) PCT Filed: Jun. 27, 2013
(86) PCT No.: PCT/JP2013/004020
§ 371 (c)(1),
(2) Date: Jun. 5, 2015
(87) PCT Pub. No.: WO2014/091639
PCT Pub. Date: Jun. 19, 2014

(65) Prior Publication Data
US 2015/0318010 A1 Nov. 5, 2015

(30) Foreign Application Priority Data

Dec. 12, 2012 (JP) .................................. 2012-271045

(51) Int. Cl.
*G11B 7/09* (2006.01)
*G11B 7/1365* (2012.01)
(Continued)

(52) U.S. Cl.
CPC .......... *G11B 7/00458* (2013.01); *G11B 7/0903* (2013.01); *G11B 7/0912* (2013.01);
(Continued)

(58) Field of Classification Search
CPC ...... G11B 7/0045; G11B 7/0458; G11B 7/09; G11B 7/0903; G11B 7/0912; G11B 7/131; G11B 7/135; G11B 7/1365; G11B 7/1353; G11B 7/1381; G11B 2007/0013; G11B 7/0943; G11B 2007/0006; G11B 7/00458; G11B 7/0901; G11B 7/0941; G11B 7/0948; G11B 7/133; G11B 7/13927; G11B 2007/13727; G11B 7/094; G11B 7/1275; G11B 7/1369; G11B 5/3083; G02B 5/3016; G02B 5/1871; G02B 27/286; G02B 6/105; G03F 7/70191; G03H 2250/38; G03H 1/22
See application file for complete search history.

(56) References Cited

U.S. PATENT DOCUMENTS 4,935,913 A 6/1990 Shinoda
5,130,965 A 7/1992 Karaki et al.
(Continued)

FOREIGN PATENT DOCUMENTS

JP 63-249941 A 10/1988
JP 02-021431 A 1/1990
(Continued)

OTHER PUBLICATIONS

International Search Report for corresponding International Application No. PCT/JP2013/004020 mailed Jul. 30, 2013.

*Primary Examiner* — Dionne H Pendleton
(74) *Attorney, Agent, or Firm* — Renner, Otto, Boisselle & Sklar, LLP

(57) ABSTRACT

An optical pickup includes a light source 1; a diffraction element 2 for generating a write main beam and a read sub-beam via diffraction; an objective lens 5; a wavelength plate 9; a polarization hologram element 7 having a plurality of diffraction regions with different diffraction characteristics, designed so that each diffraction region separates a light beam reflected from the optical storage medium and transmitted through the wavelength plate into a $0^{th}$ order light beam and $\pm 1^{st}$ order light beams; an actuator 11; and a photodetector 10 configured to detect a light beam reflected from the optical storage medium 6 and diffracted by the polarization hologram element 7. The photodetector 10 generates an RF signal from a detection result concerning a $0^{th}$ order light beam derived from the main beam, generates a focus error signal and a tracking error signal from a detection result concerning one of $\pm 1^{st}$ order light beams derived from the main beam, and generates a signal indicating that data has been recorded normally from a detection result concerning a $0^{th}$ order light beam derived from the sub-beam.

10 Claims, 16 Drawing Sheets

(51) Int. Cl.
 *G11B 7/1353* (2012.01)
 *G11B 7/0045* (2006.01)
 *G02B 5/30* (2006.01)
 *G02B 5/18* (2006.01)
 *G02B 27/28* (2006.01)
 *G11B 7/131* (2012.01)

(52) U.S. Cl.
 CPC .......... *G11B7/1353* (2013.01); *G11B 7/1365* (2013.01); *G02B 5/1871* (2013.01); *G02B 5/3016* (2013.01); *G02B 27/286* (2013.01); *G11B 7/131* (2013.01)

(56) References Cited

U.S. PATENT DOCUMENTS

| | | | |
|---|---|---|---|
| 5,757,754 A | 5/1998 | Yamamoto et al. | |
| 6,088,310 A * | 7/2000 | Yanagawa | G11B 7/0903 369/44.38 |
| 6,584,059 B1 | 6/2003 | Saimi et al. | |
| 2002/0041542 A1* | 4/2002 | Sano | G11B 7/13927 369/44.23 |
| 2005/0237902 A1* | 10/2005 | Nishiwaki | G11B 7/1353 369/112.12 |
| 2009/0168628 A1* | 7/2009 | Nishimoto | G11B 7/1353 369/103 |
| 2011/0027494 A1* | 2/2011 | Tan | B29D 11/0074 427/508 |
| 2012/0051204 A1* | 3/2012 | Ohnishi | G11B 7/0912 369/112.03 |

FOREIGN PATENT DOCUMENTS

| | | |
|---|---|---|
| JP | 03-029122 A | 2/1991 |
| JP | 05-120690 A | 5/1993 |
| JP | 06-162532 A | 6/1994 |
| JP | 06-325400 A | 11/1994 |
| JP | 08-306057 A | 11/1996 |
| JP | 2000-306262 A | 11/2000 |
| JP | 2002-100066 A | 4/2002 |
| JP | 3377334 B2 | 12/2002 |
| JP | 2004-318958 A | 11/2004 |
| JP | 2006-286070 A | 10/2006 |
| JP | 2007-334948 A | 12/2007 |
| JP | 2009-181670 A | 8/2009 |

\* cited by examiner

CHANGE IN FOCUS BALANCE  Δ 0.04%
CHANGE IN FOCUS OFFSET  Δ -0.37%

Just focus

Defocus

CHANGE IN FOCUS BALANCE  24.2%
CHANGE IN FOCUS OFFSET  25.4%

$$\text{※TE OFFSET (\%)} = \frac{TA-TB}{2(TA+TB)} \times 100$$

OPTICAL PICKUP AND OPTICAL RECORDING AND REPRODUCING DEVICE

TECHNICAL FIELD

The present disclosure relates to an optical pickup and optical recording/reproduction apparatus which, at the same time of recording information on an optical storage medium such as an optical tape, simultaneously reproduces the recorded information.

BACKGROUND ART

Recent years have seen upgrading in the quality of digital data such as videos, photographs, and the like, and conversion of paper media into electronic forms, and so on, which have resulted in drastic increases in their data amounts. In particular, in models called cloud computing, where various applications and various services are offered for use via servers, storages, and the like which are on a network, large numbers of users save various data in the storages on the network. This results in huge amounts of data accumulation.

Conventionally, magnetic tape apparatuses have often been used as storages for saving. In their place, optical tape apparatuses have been proposed which simultaneously perform recording and reproduction on an optical tape medium with a plurality of optical pickups, by utilizing a high-density recording technique based on light. For example, Patent Document 1 discloses an example of such an optical tape apparatus.

In the conventional magnetic tape apparatuses, a write head and a read head are separately provided for a track in which data is to be recorded. While recording data with the write head, the data which has been recorded is reproduced with the read head, thus making it possible to check (verify) whether the data has been correctly recorded or not. By doing so, magnetic tape apparatuses ensure reliability of data recording.

Also in optical recording/reproduction apparatuses which perform recording/reproduction for optical discs by using light, techniques of performing a verify are known. Such techniques are called DRAW (Direct Read After Write). An optical recording/reproduction apparatus which utilizes the DRAW technique employs a diffraction grating to split a light beam having been emitted from a laser light source into a $0^{th}$ order light beam and $\pm 1^{st}$ order light beams, and allow these split light beams to be radiated onto a recording layer of an optical disc. Data recording is performed with the irradiation of $0^{th}$ order light, and a verify is performed by detecting the $\pm 1^{st}$ order light which has been reflected from the optical disc.

With the DRAW technique, immediately after a recorded mark is formed on a track with the $0^{th}$ order light beam, that recorded mark is error-checked. This attains an enhanced processing speed relative to performing an error check only after recording has entirely been completed. As a result, the data transfer rate of the optical recording/reproduction apparatus can be increased. Recording/reproduction apparatuses utilizing the DRAW technique are disclosed in Patent Document 2, for example.

On the other hand, in an optical recording/reproduction apparatus, it is necessary to form a write beam spot and a read beam spot on a recording track which is within a recording layer. In order to maintain these beam spots at appropriate positions with a high accuracy, tracking control and focus control must be performed. Magnitudes of defocus and mistracking are indicated by, respectively, a "focus error signal" and a "tracking error signal" which are generated based on reflected light from the optical storage medium.

As a focus control method in conventional optical disc apparatuses, the astigmatic method has long been known, for example, which is used in many optical disc apparatuses even nowadays. Other known methods are the spot size detection method (SSD method) and the like. Focus control based on the SSD method is disclosed in Patent Document 3, for example.

On the other hand, as tracking control methods in conventional optical disc apparatuses, the push-pull method (PP method), the advanced push-pull method (APP method), and the correct far field method (CFF method) are known, for example. Tracking control based on the PP method, the APP method, and the CFF method, respectively, is disclosed in Patent Documents 4 to 6.

CITATION LIST

Patent Literature

[Patent Document 1] Japanese Laid-Open Patent Publication No. 2006-286070
[Patent Document 2] Japanese Laid-Open Patent Publication No. 63-249941
[Patent Document 3] Japanese Laid-Open Patent Publication No. 2-21431
[Patent Document 4] Japanese Laid-Open Patent Publication No. 6-162532
[Patent Document 5] Japanese Laid-Open Patent Publication No. 8-306057
[Patent Document 6] Japanese Laid-Open Patent Publication No. 2000-306262
[Patent Document 7] Japanese Patent No. 3377334

SUMMARY OF INVENTION

Technical Problem

Conventional optical recording/reproduction apparatuses, whose intended storage media are mainly optical discs, cannot stably apply tracking control and focus control to any optical storage media, such as an optical tape, in which track positions may significantly fluctuate during recording/reproduction.

In one embodiment of the present disclosure, there is provided an optical pickup and optical recording/reproduction apparatus which attains the DRAW function, and which also provides a stable tracking and focusing performance even with optical storage media, which incur relatively large fluctuations in track position (shift amounts of the objective lens) during operation.

Furthermore, another embodiment of the present disclosure provides a simple and compact optical pickup and optical recording/reproduction apparatus which provides an RF signal with a high S/N ratio, while achieving a stable tracking and focusing performance.

Solution to Problem

An optical pickup according to an embodiment of the present disclosure is an optical pickup for, while recording data onto a track of an optical storage medium, reading data that has been recorded on the track, comprising: a light source for emitting a light beam; a diffraction element for separating the light beam emitted from the light source into a plurality of light beams including a write main beam and a read sub-beam; an objective lens configured to converge the main beam and the sub-beam onto a same track on the optical storage medium; a wavelength plate disposed on an optical path from the diffraction element to the optical storage medium, the wavelength plate being designed so that a polarization direction of light which is incident from the diffraction element onto the wavelength plate is orthogonal to a polarization direction of light reflected from the optical storage medium and transmitted through the wavelength plate; a polarization hologram element having a plurality of diffraction regions with different diffraction characteristics, designed so that each diffraction region separates a light beam reflected from the optical storage medium and transmitted through the wavelength plate into a $0^{th}$ order light beam and $\pm 1^{st}$ order light beams; an actuator for integrally driving the objective lens and the polarization hologram element for focus control and tracking control; and a photodetector configured to detect a light beam reflected from the optical storage medium and diffracted by the polarization hologram element, the photodetector generating an RF signal from a detection result concerning a $0^{th}$ order light beam derived from the main beam, generating a focus error signal and a tracking error signal from a detection result concerning one of $\pm 1^{st}$ order light beams derived from the main beam, and generating a signal indicating that data has been recorded normally from a detection result concerning a $0^{th}$ order light beam derived from the sub-beam.

Advantageous Effects of Invention

According to one embodiment of the present disclosure, with a simple detector construction, a focus error signal, a tracking error signal, and an RF signal can be obtained with high quality. In particular, stable tracking control and focus control is possible even in an optical recording/reproduction apparatus which incurs relatively large shift amounts of the objective lens, e.g., an optical tape apparatus.

Furthermore, according to another embodiment of the present disclosure, signals for off-tracking detection of a sub-beam for DRAW purposes and for phase-difference TE detection can also be simultaneously generated. Therefore, an optical recording/reproduction apparatus which performs a stable operation can be realized with a simple construction.

DESCRIPTION OF EMBODIMENTS

Figure 1A:
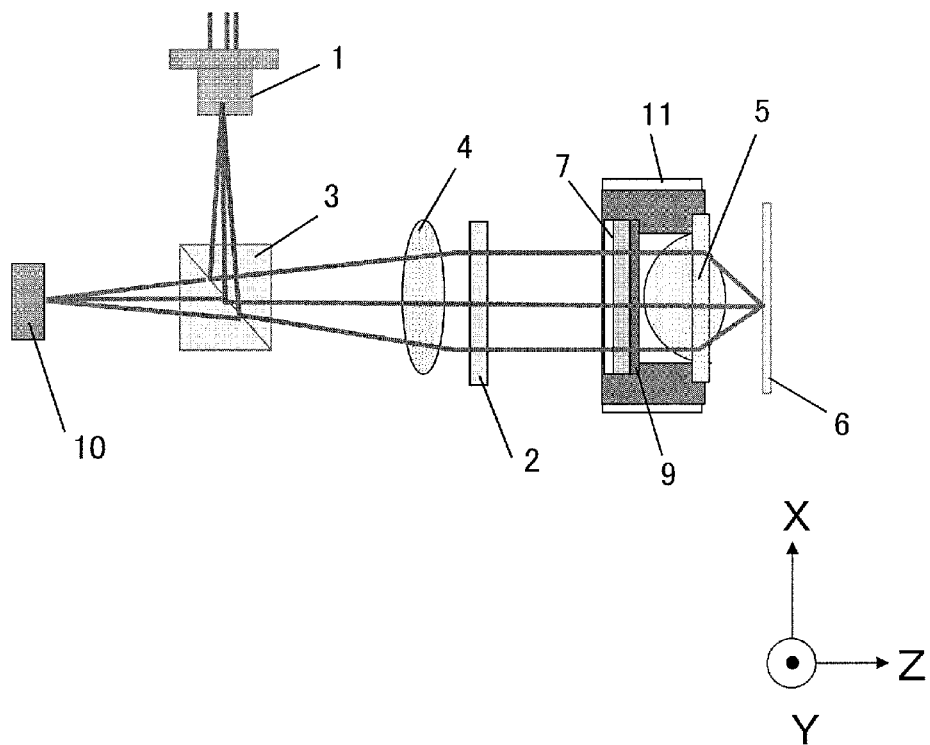
FIG. 1A A construction diagram of an optical pickup according to Embodiment 1.

Embodiments will now be described in detail, referring to the drawings as necessary. Note however that unnecessarily detailed descriptions may be omitted. For example, detailed descriptions on what is well known in the art or redundant descriptions on what is substantially the same construction may be omitted. This is to avoid lengthy description, and facilitate the understanding of those skilled in the art.

The accompanying drawings and the following description, which are provided by the present inventors so that those skilled in the art can sufficiently understand the present disclosure, are not intended to limit the scope of claims.

Prior to describing specific embodiments, findings which serve as the basis of the present disclosure will be described first.

Conventional optical disc apparatuses move one optical pickup that is mounted on a transport mechanism (actuator) in a radial direction across the entire region of an optical disc from the inner periphery to the outer periphery, thus performing recording and reproduction on the entire disc surface.

On the other hand, in the case of using an optical tape as the optical storage medium, a plurality of optical pickups are fixedly arrayed on a non-movable base, these optical pickups being slightly displaced, as disclosed in Patent Document 1. Among a plurality of recording zones in the optical tape, each optical pickup performs recording and reproduction for the one recording zone that is assigned thereto. By shifting an objective lens with an actuator, each pickup is able to perform recording and reproduction for a number of tracks within the recording zone that corresponds to the movable range of the objective lens. For accessing all tracks within the recording zone, each pickup needs to shift the objective lens in a movable range of about ±0.2 mm.

While the optical tape is running, the position of each track is determined based on the position of the tape edge, which in turn is defined by a tape guide; this causes fluctuations in the position of the track groove (called "run out" of the optical tape) relative to the position of the optical pickup. These fluctuations in position are generally about ±0.1 to 0.3 mm, although depending on the environment.

Therefore, even disregarding the margin of error during manufacture of the optical tape, a total of about ±0.3 to 0.5 mm of objective lens shifting is required in order to follow a track.

In conventional optical disc apparatuses, e.g., BD, an about ±0.05 mm followability of the objective lens is required for recordable discs, and that of about ±0.1 mm for read-only discs. Thus, by design, it has been considered sufficient to provide a movable range of about ±0.2 mm. However, in an optical tape apparatus, the objective lens needs to move across a very broad range which is 1.5 to 2 times, or greater, of the movable range of an optical disc apparatus.

However, as will be indicated below, moving an objective lens across such a broad range will not allow for stable tracking control and focus control under the conventional control methods. Therefore, the inventors have studied constructions and control methods for realizing a DRAW function and achieving stable tracking control and focus control for optical storage media which incur large fluctuations in track position (shift amounts of the objective lens) during operation, e.g., an optical tape.

Hereinafter, problems in the conventional control methods will be described in more detail. In the following description, a focus error signal may be referred to as an "FE signal" or a "focus signal", whereas a tracking error signal may be referred to as a "TE signal" or a "tracking signal".

(Problems of Focus Control Under the Astigmatic Method)

The following problems will occur when the astigmatic method, which has widely been used as a focus error signal detection method, is adopted for an optical pickup in which the objective lens undergoes large amounts of shift by the actuator of the optical pickup.

Figure 10A:
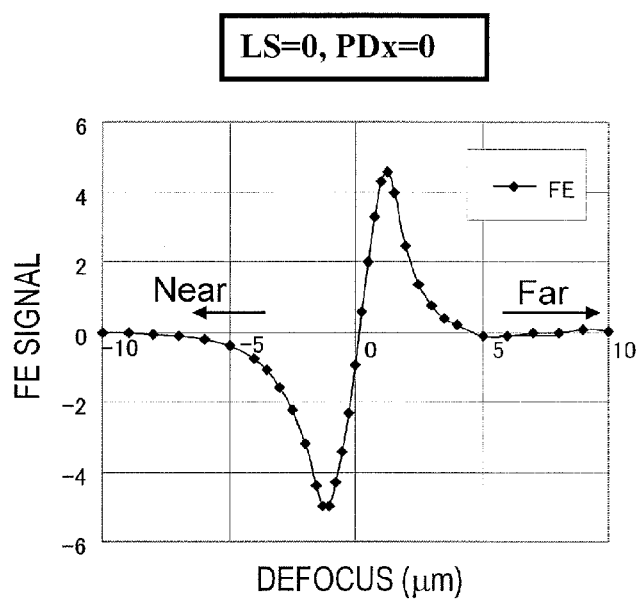
FIG. 10A A diagram showing FE detection characteristics, under the astigmatic method, of an optical pickup according to Comparative Example (in the absence of defocus).
Figure 10B:
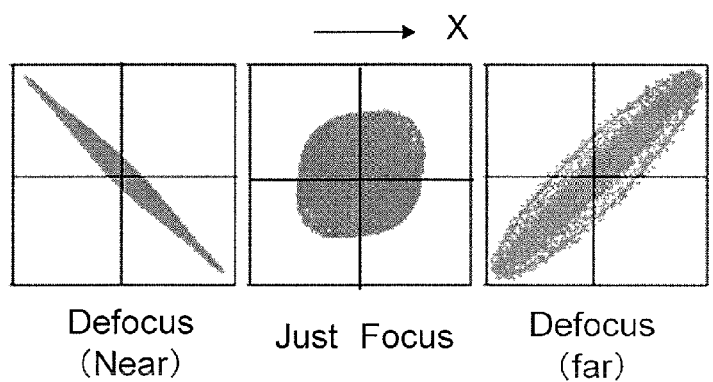
FIG. 10B A diagram showing light spots on a photodetector of an optical pickup according to Comparative Example (in the absence of defocus)

FIG. 10A is a diagram showing results of FE signal calculation in an optical pickup for which the astigmatic method is adopted, in the case where there is no displacement between the detector position and the position of a light spot which is formed on the detector (PDx=0) and also there is no shift of the objective lens (which hereinafter may also be referred to as a "lens shift") (LS=0). FIG. 10B schematically shows how the light spot may appear on the detector in this case. In FIG. 10A, the position of the objective lens is taken on the horizontal axis, against an origin which is the position of the objective lens in a focused state, where the direction away from the optical storage medium is defined as the positive direction and the direction toward it is defined as the negative direction, the degree of defocus being indicated in absolute values. As shown in FIG. 10B, in a focused state (Just Focus), a near-circular shaped light spot is formed around the center of the detector; in non-focused states (Defocus), on the other hand, a light spot is formed in an ellipse shape which is obliquely elongated. In this case, as shown by the graph of FIG. 10A, a good FE signal waveform which is generally referred to as an "S" curve is obtained.

Figure 10C:
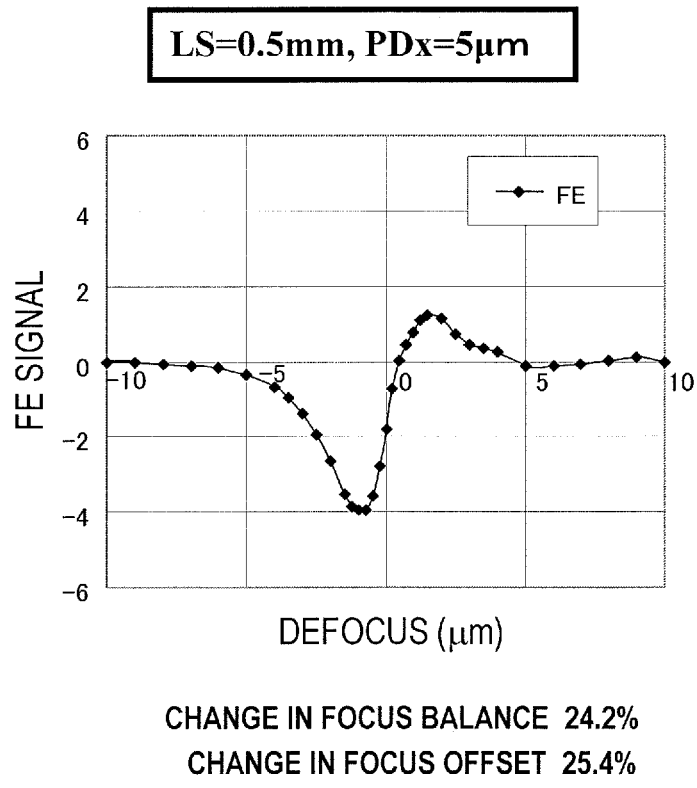
FIG. 10C A diagram showing FE detection characteristics, under the astigmatic method, of an optical pickup according to Comparative Example (in the presence of defocus).
Figure 10D:
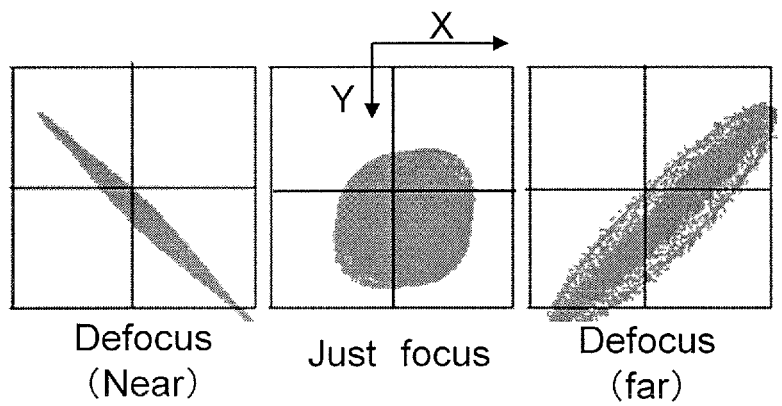
FIG. 10D A diagram showing light spots on a photodetector of an optical pickup according to Comparative Example (in the presence of defocus)

On the other hand, FIG. 10C is a diagram showing results of FE signal calculation in a state where, due to influences such as misadjustment or aging, for example, the position of the light spot on the detector is displaced by 5 μm in the X direction in the figure (PDx=5 μm), with also a lens shift of 0.5 mm (LS=0.5 mm). FIG. 10D is a diagram schematically showing how the light spot may appear on the detector in this case. In this case, as shown by the graph of FIG. 10C, the FE signal waveform is significantly distorted, and focus control is disabled due to a deterioration in the focus balance (balance between the FE signal on the + side and the FE signal on the − side), the focus offset (i.e., an offset of a DC component of the FE signal under defocus=0) taking a large value which exceeds 20% of the amplitude, or other influences. Therefore, it is difficult to adopt the astigmatic method as a method of focus error signal detection.

(Problems of Tracking Control Under the DPP Method)

Next, the tracking error signal (TE signal) will be discussed.

As has been described above, an optical pickup having a DRAW function splits a light beam which is emitted from the light source into a main beam (write beam) and sub-beams (read beams), and forms therefrom a plurality of light spots on the same track.

However, in a commonly-used TE signal detection method based on the three beam method (DPP method; differential push-pull method), the light spots which are created by the sub-beams and the light spot which is created by the main beam need to be displaced by a half track pitch, in a direction perpendicular to the track (which hereinafter may be referred to as the "tracking direction"). Therefore, an optical pickup having a DRAW function is unable to detect a tracking signal by the three beam method utilizing sub-beams spots. Hence, a tracking detection method based on the 1-beam method is to be adopted. As used herein, a 1-beam method is a method which obtains a tracking error signal by only using a main beam.

(Problems of Tracking Control Under the PP Method and the APP Method)

As tracking detection methods based on the 1-beam method, for example, a push-pull method (PP method) and an advanced push-pull method (APP method) are often used in optical disc apparatuses and the like, as has been described above. However, the following problems will occur when such conventional tracking detection methods are straightforwardly applied to an optical tape apparatus.

Firstly, the PP method has always suffered from a large TE signal offset due to lens shifts. When it is applied to an optical tape apparatus, which incurs even greater amounts of lens shift, the tracking control will be very unstable, and track jumps are likely to occur.

On the other hand, the APP method is available as a method which improves on the TE signal offset associated with lens shifts. However, when the amount of lens shift is large, the APP method also has its problems as follows.

Figure 11A:
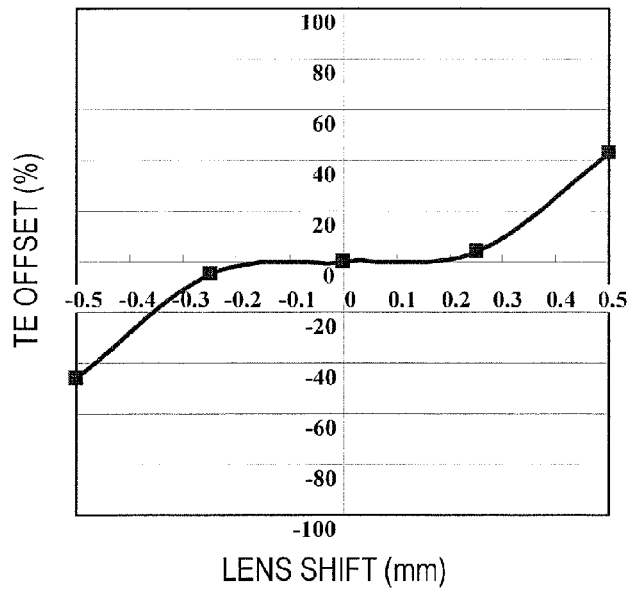
FIG. 11A A diagram showing lens shift dependence of TE offset, under the APP method, of an optical pickup according to Comparative Example.
Figure 11B:
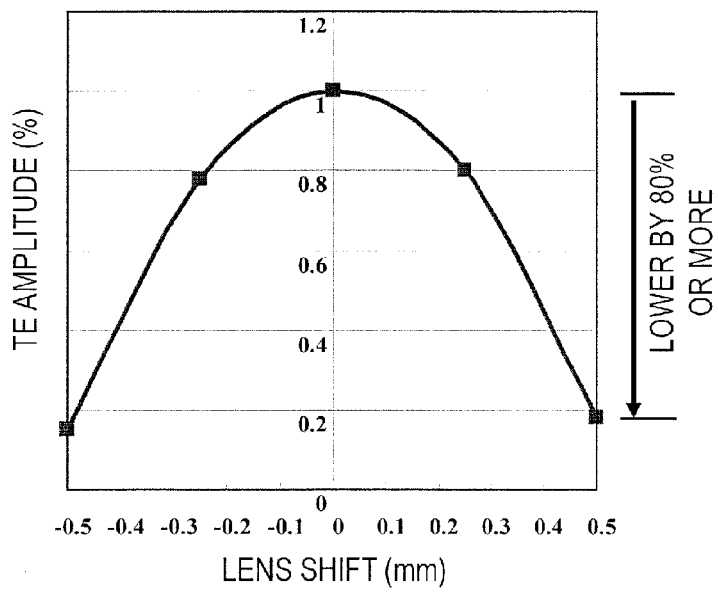
FIG. 11B A diagram showing lens shift dependence of TE amplitude, under the APP method, of an optical pickup according to Comparative Example.

FIGS. 11A and 11B are diagrams showing results of TE signal calculation when assuming a lens shift range of ±0.5 mm under the APP method. FIG. 11A shows changes in TE offset with respect to the amount of lens shift in this case. Herein, the TE offset is defined as TE offset (%)=(TA−TB)/2(TA+TB)×100. TA and TB represent the positive amplitude and the negative amplitude, respectively, of the tracking error signal. As indicated by the graph of FIG. 11A, the TE offset drastically increases when the absolute value of the lens shift becomes greater than 0.3 mm.

FIG. 11B shows changes in TE signal amplitude with respect to the amount of lens shift in this case. As indicated by this graph, the amplitude drastically decreases when the absolute value of the lens shift becomes greater than 0.3 mm. This causes considerable changes in the loop gain of tracking control, thereby making the operation unstable. Therefore, the APP method too is not applicable to an optical tape apparatus, which requires lens shift amounts of about 0.3 mm to about 0.5 mm.

(Problems of Combination of the SSD Method and the CFF Method)

For the above reasons, as the detection method, a combination of focus error detection by the SSD method and tracking error detection by the CFF method will be considered.

A detection method which combines the SSD method and the CFF method is disclosed in Patent Document 7, for example. In this detection method, light which has been reflected from an optical storage medium is diffracted by using a polarization-type hologram or the like to obtain desired signals. Herein, in terms of light amounts (or the S/N ratio), a construction which generates an RF signal (a signal obtained by reproducing recorded data) by utilizing $0^{th}$ order light, as has been done in conventional astigmatic methods, is advantageous. Therefore, a construction will be considered which generates an RF signal based on a detection result concerning $0^{th}$ order light, and generates servo signals based on a detection result concerning hologram-diffracted light (±$1^{st}$ order light). Such a construction will have the following problems.

Figure 12A:
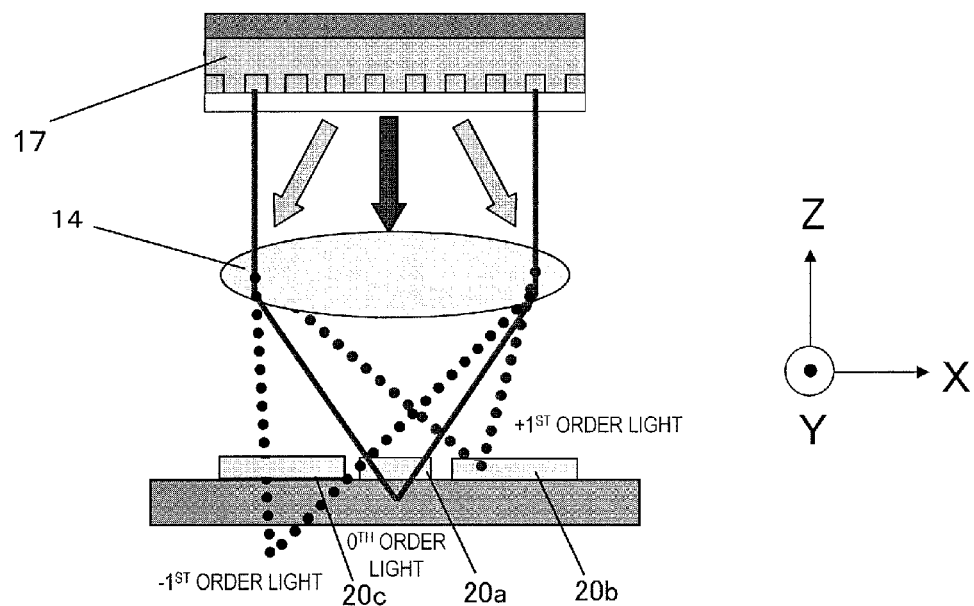
FIG. 12A A cross-sectional view showing a detection system of an optical pickup which utilizes $0^{th}$ order light and $\pm 1^{st}$ order light.
Figure 12B:
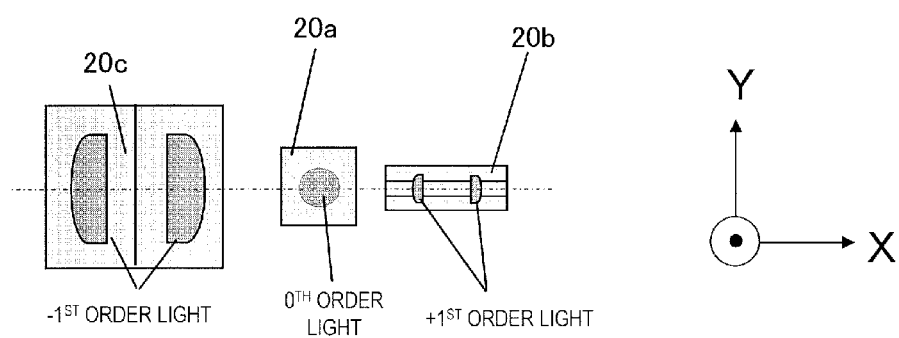
FIG. 12B A plan view showing a detection system of an optical pickup which utilizes $0^{th}$ order light and $\pm 1^{st}$ order light.

FIG. 12A is a schematic diagram showing the construction of a detection system which generates an RF signal, an FE signal, and a TE signal based on, respectively, $0^{th}$ order light, +$1^{st}$ order light, and −$1^{st}$ order light that have occurred from light being reflected from the optical storage medium and entering the polarization-type hologram 17. This detection system includes a detector 20a for detecting $0^{th}$ order light, a detector 20b for detecting +$1^{st}$ order light, and a detector 20c for detecting −$1^{st}$ order light.

When the light-receiving surface of the detector 20a is provided near the convergence point of a collimating lens 14, the beam spot will become too narrow on the light-receiving surface of the detector 20a, thereby resulting in problems such as difficulty in adjusting the photosensitive element positions, or a decrease in the detector response due to reduced carrier mobility in the optical semiconductor of the photosensitive elements.

On the other hand, when the light-receiving surface of the detector 20a is displaced from the convergence point of the collimating lens 14, designing the hologram pattern so that either one of the ±$1^{st}$ order light (i.e., +$1^{st}$ order light in the example shown in FIG. 12A) creates a moderate spot size on the detector 20b will cause the other light (i.e., −$1^{st}$ order light in the example shown in FIG. 12A) to diverge, resulting in an expanded spot size on the detector 20c.

Therefore, the detector size on the tracking side will become too large and the response will be poor when adopting a construction where a focus signal is detected by using one of $1^{st}$ order light (i.e., +$1^{st}$ order light in the example shown in FIG. 12A) and a tracking signal is detected by using the other (i.e., −$1^{st}$ order light in the example shown in FIG. 12A), as in Patent Document 7.

Furthermore, an optical pickup having a DRAW function also has the following problems.

An optical pickup having a DRAW function splits a light beam which is emitted from a light source into a plurality of light beams including a main beam (write beam) and sub-beams (read beams). Therefore, three light spots of main (zero order) and sub (+$1^{st}$ order, −$1^{st}$ order) occur on the detector, corresponding to the diffracted light ($0^{th}$ order light, +$1^{st}$ order light, −$1^{st}$ order light) from the polarization hologram 17.

A sub-beam for DRAW is a beam for the signal reproduction when conducting a data verify during recording, and therefore needs to provide an adequate spot quality on the recording layer of the storage medium. In particular, in order to decrease the off-axis aberration to a certain extent, it is necessary to reduce the spot interval between the main beam and the sub-beam on the recording layer. However, as described above, the main and sub light spots occur on the detector so as to respectively correspond to the $0^{th}$ order light and the ±$1^{st}$ order light from the polarization hologram 17; therefore, reducing the spot interval between a main beam and a sub-beam on the recording layer will also result in the main spot and the sub-spot being close to each other on the detector. It is difficult to design a light-receiving pattern layout on the detector such that they will not interfere with each other.

With the various problems described above, there has never been a detection system in an optical pickup having a DRAW function that can cope with large lens shifts. Based on the above study results, the inventors have accomplished the optical pickup of the present disclosure.

Hereinafter, optical pickups according to embodiments of the present disclosure will be described in detail, with reference to the drawings. In the following description, identical reference numerals are given to identical or corresponding constituent elements. The coordinate system shown in any figure is a coordinate system that is fixed on the optical pickup, the absolute direction of each coordinate component varying in accordance with the posture of the optical pickup. In the present specification, a coordinate component in the direction of a track of an optical storage medium will be denoted Y; a coordinate component in a perpendicular direction to the track will be denoted X; and a coordinate component in a direction which is perpendicular to X and Y and which goes from the objective lens to the optical storage medium will be denoted Z.

Embodiment 1

First, an optical pickup according to Embodiment 1 will be described.

[1-1. Overall Construction]

FIG. 1A is a schematic diagram showing the construction of an optical system of an optical pickup according to the present embodiment.

The present optical pickup includes a laser light source 1; a polarization-type diffraction element 2 for diffracting light which is emitted from the laser light source 1 so as to be split into $0^{th}$ order light and $\pm 1^{st}$ order light; an objective lens 5 for converging the diffracted light onto the recording surface (recording layer) of an optical storage medium 6; a polarization-type hologram element (polarization hologram element) 7 for diffracting light which is reflected from the optical storage medium 6 so as to be split into $0^{th}$ order light and $\pm 1^{st}$ order light; and a photodetector 10 for receiving the light which has been split and diffracted by the polarization hologram element 7. The optical pickup further includes a polarization beam splitter 3, a collimating lens 4, and a ¼ wavelength plate 9. The polarization-type hologram element 7 is attached to an actuator (lens driving mechanism) 11 together with the ¼ wavelength plate 9 and the objective lens 5. Although the optical storage medium 6 is not a constituent element of the optical pickup, it is illustrated in FIG. 1A for convenience of description.

The laser light source 1 is constructed so as to emit a light beam which is intensity-modulated in accordance with an optical driving signal that is input from an optical modulation circuit not shown. As a result, the laser light source 1 emits a light beam whose intensity is modulated in accordance with the data to be recorded.

The polarization beam splitter 3 is an optical element that only reflects light of a specific polarization direction while transmitting other light. The light beam which is emitted from the laser light source 1 is led toward the optical storage medium 6, and the light beam which has been reflected from the optical storage medium 6 is led toward the photodetector 10.

The collimating lens 4, which is disposed between the polarization beam splitter 3 and the diffraction element 2, converts a light beam that has been reflected from the polarization beam splitter 11 into parallel light.

The diffraction element 2 is designed so as to diffract the light which has been reflected from the polarization beam splitter 3 and which has passed through the collimating lens 4, this light having been polarized in a specific polarization direction, thus generating diffracted light including $0^{th}$ order light and $\pm 1^{st}$ order light. The diffraction element 2 transmits any light that is polarized in directions other than the specific polarization direction without diffracting it. In the present embodiment, the $0^{th}$ order light which is diffracted here is used as a main beam for writing, and the $\pm 1^{st}$ order light is used as sub-beams for reading (for DRAW).

The polarization hologram element 7 is an optical element having diffraction regions of four polarization-types with different diffraction characteristics. Each diffraction region is designed so as to diffract light that is polarized in a direction which is perpendicular to the aforementioned specific polarization direction and the direction of travel of light, thereby generating diffracted light including $0^{th}$ order light and $+1^{st}$ order light. The polarization hologram element 7 transmits any light that is polarized in directions other than the above, without diffracting it.

The ¼ wavelength plate 9, which is disposed between the polarization hologram element 7 and the objective lens 5, converts linearly polarized light in a path from the laser light source 1 to the optical storage medium 6 (forward path) into circularly polarized light (or elliptically polarized light), and converts circularly polarized light (or elliptically polarized light) in a path from the optical storage medium 6 to the photodetector 10 (return path) into linearly polarized light. The ¼ wavelength plate 9 is designed so that the polarization direction of linearly polarized light in the forward path is orthogonal to the polarization direction of linearly polarized light in the return path.

The objective lens 5, which is disposed between the ¼ wavelength plate 9 and the optical storage medium 6, converges a light beam which has been transmitted through the ¼ wavelength plate 9 onto the recording surface of the optical storage medium 6.

In the present embodiment, the polarization hologram element 7, the ¼ wavelength plate 9, and the objective lens 5 are integrally driven by the actuator 11. These elements are constructed so as to be movable, under control of the actuator 11, in a direction (focus direction) which is perpendicular to the recording surface of the optical storage medium 6 and in a direction (tracking direction) which is parallel to the recording surface and perpendicular to a plurality of tracks which are formed on the recording surface. More specifically, a focus coil, a tracking coil, and elastic members such as springs or wires that are provided in the actuator 11 allow the objective lens 5, the wavelength plate 9, and the polarization hologram element 7 to move in accordance with voltages which are applied to the focus coil and the tracking coil. Such focus control and tracking control by the actuator 11 can be effected by a servo control circuit not shown.

The photodetector 10 is disposed so as to receive reflected light from the optical storage medium 6. The photodetector 10 includes a plurality of photosensitive elements, which respectively receive a $0^{th}$ order light beam derived from the main beam, a $\pm 1^{st}$ order light beam derived from the main beam, a $0^{th}$ order light beam derived from the sub-beams, and a $\pm 1^{st}$ order light beam derived from the sub-beams, these having occurred from the polarization hologram element 7, and each of which outputs an electrical signal in accordance with the received amount of light. The photodetector 10 also includes an arithmetic circuit which generates an RF signal, a DRAW signal, a tracking signal, and a focus signal based on such electrical signals.

The optical storage medium 6 is an optical tape, for example. As mentioned earlier, in an optical pickup which performs recording on an optical tape, the objective lens needs to move across a very broad range which is 1.5 to 2 times, or greater, of that of a conventional optical pickup for optical discs. Therefore, in the present embodiment, the actuator 11 is constructed so as to shift the objective lens 5 so that an upper limit of the shift amount from a reference position (initial position) of the objective lens 5 along the tracking direction is not less than 0.3 mm and not more than 0.6 mm. This upper limit of the shift amount is more preferably set to a value of not less than 0.35 mm and not more than 0.55 mm, and further more preferably set to a value of not less than 0.4 mm and not more than 0.5 mm.

[1-2. Operation]

Next, the operation of the optical pickup of the present embodiment will be described.

[1-2-1. Summary of Operation]

The laser light which is emitted from the laser light source 1 is efficiently reflected from the polarization beam splitter 3, and thereafter passes through the collimating lens 4 to become a parallel light beam. This parallel light beam is diffracted by the polarization-type diffraction element 2, which is in the optical path, and split into a $0^{th}$ order light beam (main beam) and $\pm 1^{st}$ order light beams (sub-beams). The split light beams are transmitted through the polarization hologram element 7 mounted on the actuator 11 and the ¼ wavelength plate 9 formed on the substrate surface of the polarization hologram element 7, and thereafter converged by the objective lens 5 onto the recording surface of the storage medium 6. The light which has been reflected from the storage medium 6 is led through the objective lens 5 and the ¼ wavelength plate 9, and enters the four diffraction regions of the polarization hologram element 7. The four diffraction regions are provided in a manner of dividing the cross section of the incident light beam into four substantially equal parts. Each of the write beam and read beams which are incident on each diffraction region is further diffracted and split into a $0^{th}$ order light beam and $\pm 1^{st}$ order light beams. Each split light beam is led through the polarization-type diffraction element 2, converged by the collimating lens 4, and efficiently transmitted through the polarization beam splitter 3 to reach the photodetector 10.

Figure 1B:
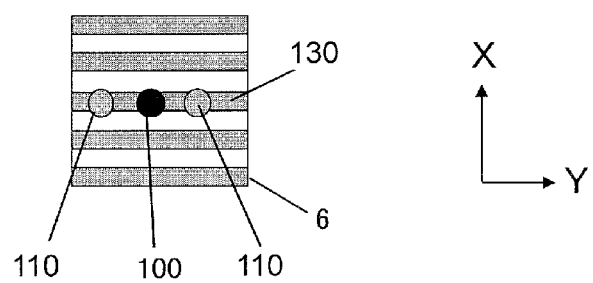
FIG. 1B A diagram showing examples of light spots formed on a recording layer of an optical storage medium according to Embodiment 1.

FIG. 1B is a diagram schematically showing three light spots that are formed on the optical storage medium 6. During a recording operation, the optical pickup forms a light spot (main spot) 100 of a main beam occurring from the diffraction element 2, and two light spots (sub-spots) 110 of sub-beams occurring from the diffraction element 2, on a single track of the optical storage medium 6. As a result, immediately after recording data with the main spot 100, DRAW can be accomplished by reading that data with one of the two sub-spots 110. Since recording is performed with the main spot 100 and DRAW is performed with a sub-spot 110 in this manner, the main spot 100 may be referred to as the "recording spot", and the sub-spot 110 the "DRAW spot". Since DRAW spots 110 are on both sides of the recording spot 100, regardless of whether the direction of travel of the storage medium 6 is in the right or left direction in the figure, a mark which has just been recorded can be read by one of the DRAW spots 110. An arrangement may be adopted where the DRAW spot to be used is switched when the direction of travel of the optical storage medium 6 is reversed; in this manner, DRAW is possible regardless of whether the optical storage medium 6 is traveling in the forward direction or the reverse direction.

[1-2-2. Details of Diffraction Element 2 and Hologram Element 7]

Figure 2A:
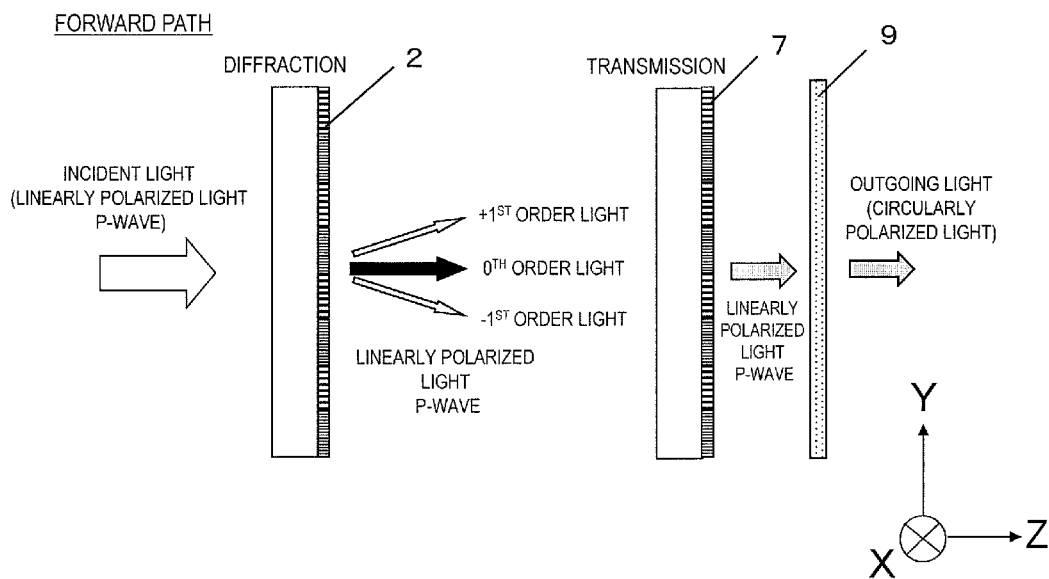
FIG. 2A A plan view showing an operation of a diffraction element and a polarization hologram in a forward path of the optical system of the optical pickup according to Embodiment 1.
Figure 2B:
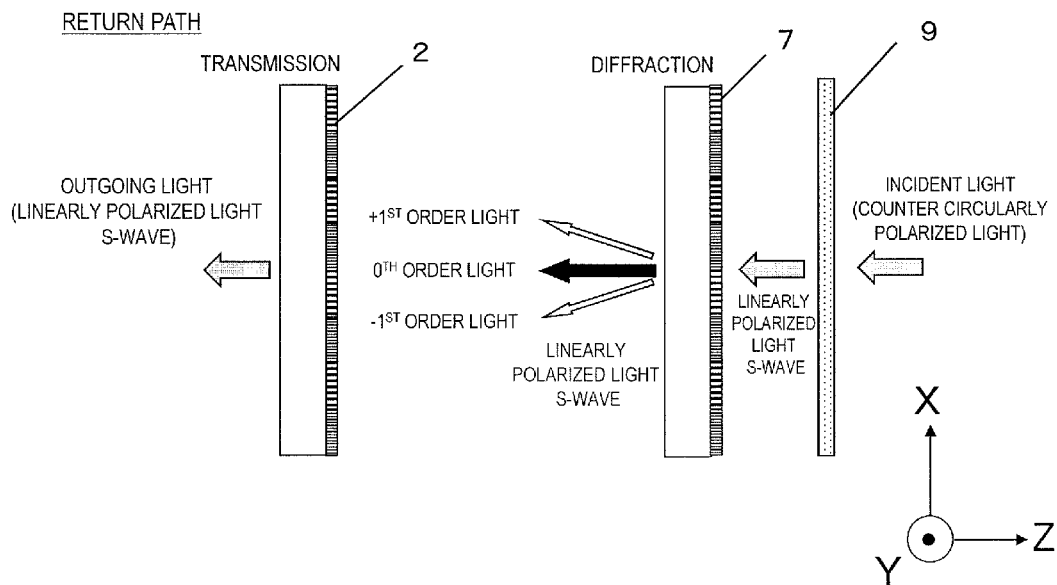
FIG. 2B A plan view showing an operation of a diffraction element and a polarization hologram in a return path of the optical system of the optical pickup according to Embodiment 1.

FIGS. 2A and 2B are diagrams showing the functions of the polarization-type diffraction element 2 and the polarization-type hologram element 7 according to the present embodiment.

FIG. 2A schematically shows how light may travel in the forward path, i.e., a path from the light source 1 to the optical storage medium 6. In the forward path, linearly-polarized light (e.g., P-polarized light) which is emitted from the laser light source 1 and reflected by the polarization beam splitter 3 is diffracted by the polarization-type diffraction element 2 with a certain diffraction efficiency, and separated into three beams, that is, $0^{th}$ order light and $\pm 1^{st}$ order light. Herein, the $0^{th}$ order light beam travels straight, while the $\pm 1^{st}$ order light beams are separated with respect to the Y direction.

These three beams enter the polarization-type hologram element 7. In the forward path, the hologram element 7 does not cause diffraction, and the three beams are intactly transmitted. In other words, both of the $0^{th}$ order light and the $\pm 1^{st}$ order light enter the ¼ wavelength plate 9 in the form of P-polarized light. When transmitted through the ¼ wavelength plate 9, each light beam which was linearly polarized light is now converted into circularly polarized light, and forms a main spot (recording spot) and two sub-spots (DRAW spots) on the recording surface of the optical storage medium 6.

In the present embodiment, $0^{th}$ order light is used as a write beam, and the $\pm 1^{st}$ order light is used as a read beam. Therefore, the diffraction ratio (diffraction efficiency) at the diffraction element 2 is set to a ratio such that any recorded mark that is formed by the write beam is not deteriorated by the read beam. Specifically, an appropriate value of the intensity ratio between the $0^{th}$ order light and the $+1^{st}$ order light (or the $-1^{st}$ order light) is, approximately, 1:0.05 to 0.2. Thus, the diffraction efficiency of the diffraction grating 2 is designed so that, when the light amount of the write beam is set to a power that is suitable for recording, the sub-beam has a light amount that is suitable for reproduction.

On the other hand, FIG. 2B schematically shows how light may travel in the return path, i.e., the path from the optical storage medium 6 to the photodetector 10. In the return path, circularly polarized light which has been reflected by the optical storage medium 6 is converted by the ¼ wavelength plate 9 into linearly polarized light (e.g., S-polarized light) which is polarized in a direction that is orthogonal to the polarization direction in the forward path. This linearly polarized light is diffracted by the polarization hologram element 7 with a certain diffraction efficiency, and separated into $0^{th}$ order light and $\pm 1^{st}$ order light. At this time, $0^{th}$ order light and $\pm 1^{st}$ order light occur for each of the main beam and sub-beams. The $0^{th}$ order light beam travels straight, while the $\pm 1^{st}$ order light beams are separated with respect to the X direction.

These plural beams enter the polarization-type diffraction element 2. In the return path, the diffraction element 2 does not cause diffraction, so that each beam is intactly transmitted. In other words, the $0^{th}$ order light and the $\pm 1^{st}$ order light are incident on the photodetector 10 in the form of S-polarized light, thus forming a plurality of light spots (detection light spots) on the plurality of detectors 10.

In the present embodiment, as will be described later, $0^{th}$ order light and $+1^{st}$ order light derived from the main beam are used as an RF signal and servo signals, respectively. In order to maintain the S/N of mainly the RF signal while securing the quality of the servo signals, an appropriate value of the diffraction ratio between the $0^{th}$ order light and the $+1^{st}$ order light by the polarization hologram element 7 is, approximately, 1:0.05 to 0.2.

Thus, by using the polarization-type diffraction element 2 and the polarization-type hologram element 7 causing diffraction in polarization directions that are orthogonal to each other, a high light transmission efficiency can be achieved in both of the forward path from the light source 1 to the storage medium 6 and the return path from the storage medium 6 to the detector 10. Therefore, the output loss of the laser light source 1 can be kept low, and a high S/N ratio is maintained in the detection signal. Moreover, the problem of stray light coming into the detector 10 due to unwanted diffraction is also unlikely to occur.

Figure 3A:
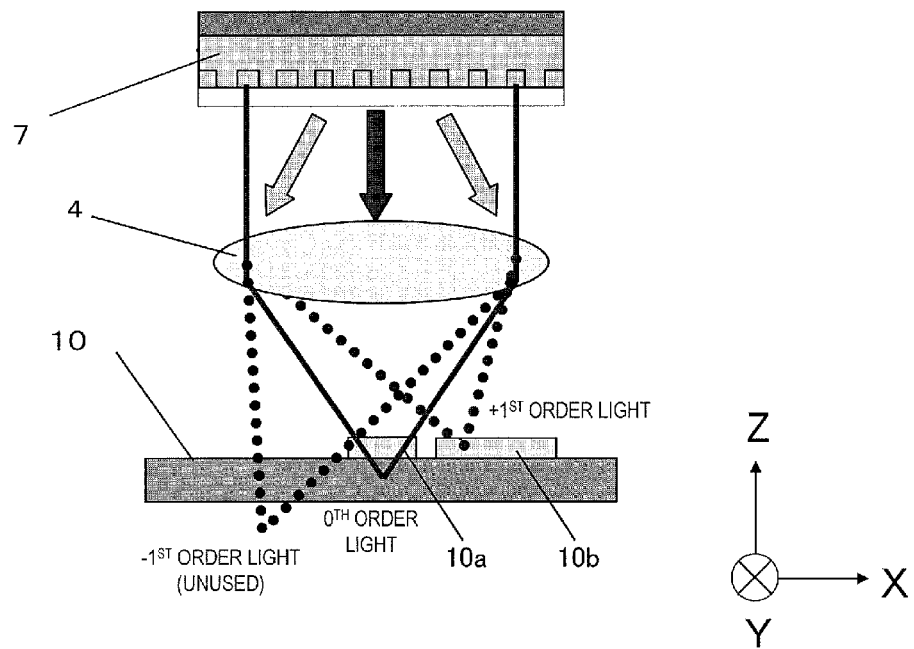
FIG. 3A A diagram schematically showing diffraction of light by a polarization hologram element 7 and light spots on the light-receiving surface of a detector 10 according to Embodiment 1.
Figure 3B:
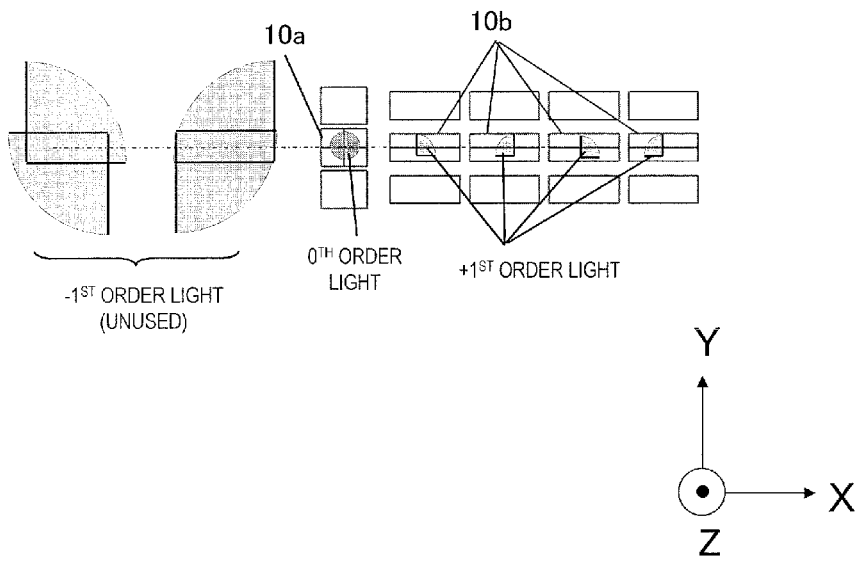
FIG. 3B A plan view showing a schematic construction of the light-receiving surface of the detector 10 according to Embodiment 1.

FIG. 3A is a summarized side view showing the relationship between a light beam diffracted by the polarization hologram element 7 and the photodetector 10. FIG. 3B is a plan view showing the light-receiving surface of the detector 10. In FIGS. 3A and 3B, in order to simplify the description, only the $0^{th}$ order light and $\pm 1^{st}$ order light derived from the main beam will be described, while not referring to the $\pm 1^{st}$ order light (sub-beams) generated by the diffraction element 2 in the forward path.

The photodetector 10 includes a photosensitive element 10a for detecting $0^{th}$ order light derived from the $+1^{st}$ main beam and a photosensitive element 10b for detecting order light derived from the main beam. The $0^{th}$ order light, $+1^{st}$ order light, and $-1^{st}$ order light occurring as a result of the main beam reflected from the optical storage medium 6 entering the polarization hologram element 7 is converged by the collimating lens 4, and travels toward the photodetector 10. The $0^{th}$ order light is incident on the photosensitive element 10a, whereas the $+1^{st}$ order light is incident on the photosensitive element 10b. The $-1^{st}$ order light is not used in the present embodiment. A signal indicating the intensity of the $0^{th}$ order light incident on the photosensitive element 10a is used as an RF signal.

In the present embodiment, the light-receiving surface of the detector 10 along the Z direction is positioned away from the neighborhood of the focal point position of the $0^{th}$ order light by the collimating lens 4, in order to avoid deterioration in the response of the detector 10 as mentioned above.

Furthermore, as shown in FIG. 3B, a focus signal by the SSD method is obtained by using the $+1^{st}$ order diffracted light from the polarization hologram element 7. A converging ability is conferred to the hologram element 7 so that the spot size at the photosensitive element 10b is somewhat reduced, thus allowing the focus signal by the SSD method to have an adequately high focus sensitivity.

At this time, the $-1^{st}$ order diffracted light on the opposite side will conversely diverge slightly. Therefore, the present embodiment does not utilize this. In other words, it is one feature of the optical pickup in the present embodiment that it obtains an RF signal with $0^{th}$ order light and obtains servo signals with only $+1^{st}$ order light.

Figure 4A:
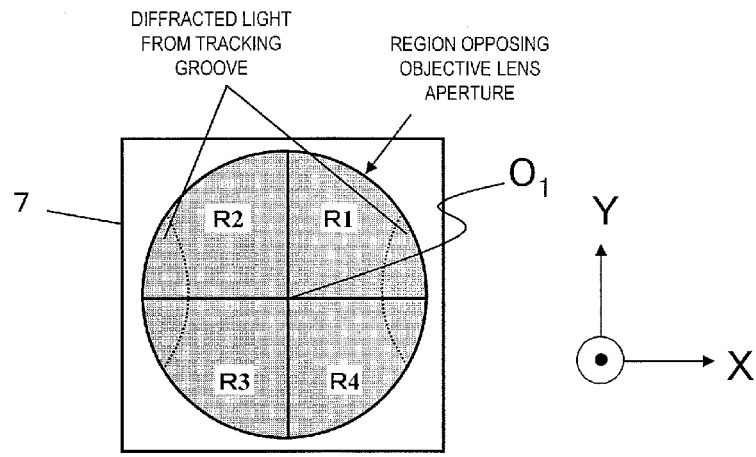
FIG. 4A A diagram showing division of diffraction regions in the polarization hologram element 7 according to Embodiment 1.

FIG. 4A is a plan view schematically showing four diffraction regions of the polarization hologram element 7 according to the present embodiment. In FIG. 4A, the X direction is a direction which is orthogonal to the track direction on the optical storage medium 6, and the Y direction is the track direction. As is shown in the figure, the polarization hologram element 7 is divided into four regions R1 to R4 by a reticle (a straight line in a direction parallel to the track and a straight line in a direction perpendicular to the track) through the center $0_1$. The center $0_1$ is a point which is traveled by the center of the main beam. The polarization hologram element 7 is attached to the actuator 11 so that X, Y coordinates of the center $0_1$ coincide with the X, Y coordinates of the center of the objective lens 5.

[1-2-3. Details of Photodetector 10]

Figure 4B:
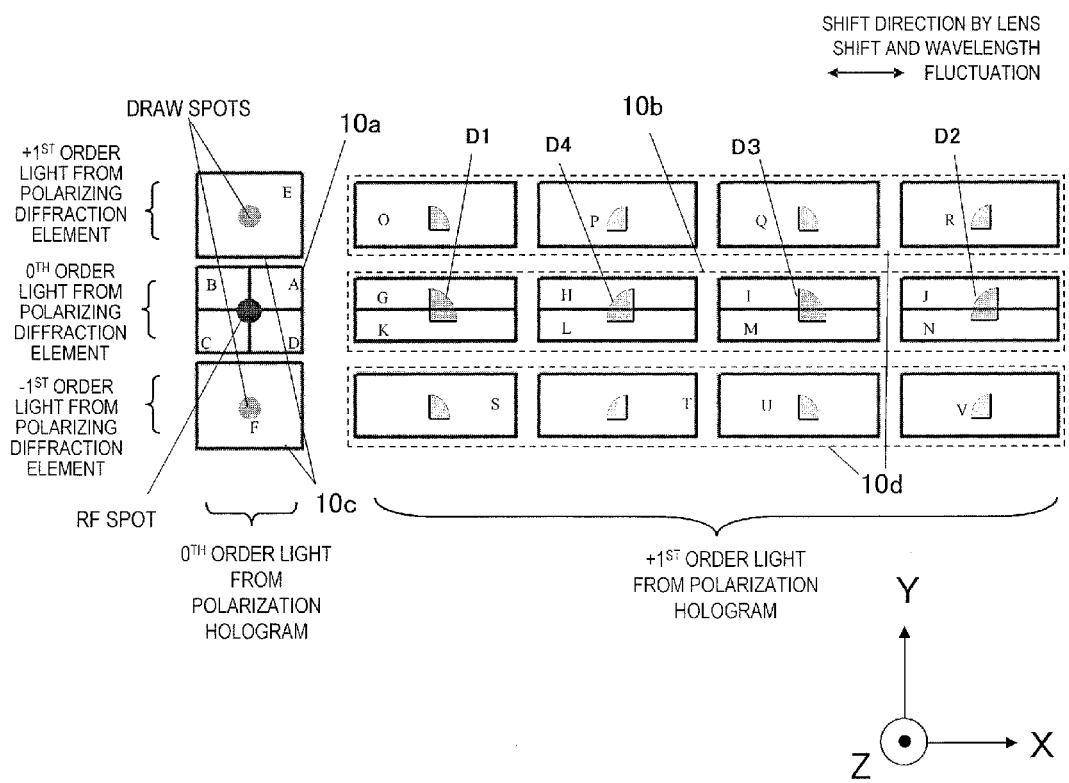
FIG. 4B A diagram showing an exemplary detector pattern according to Embodiment 1.

FIG. 4B is a plan view showing the arrangement of the plurality of photosensitive elements included in the photodetector 10. Herein, too, the X direction is a direction which is orthogonal to the track direction on the optical storage medium, and the Y direction is the track direction. As shown in the figure, the photodetector 10 includes a first photosensitive element 10a for detecting a $0^{th}$ order light beam derived from the main beam, a second photosensitive element 10b for detecting one of a $+1^{st}$ order light beam and a $-1^{st}$ order light beam derived from the main beam (which in the example of FIG. 4B is the $+1^{st}$ order light beam), a third photosensitive element 10c for detecting a $0^{th}$ order light beam derived from the sub-beams, and a fourth photosensitive element 10d for detecting one of a $+1^{st}$ order light beam and a $-1^{st}$ order light beam derived from the sub-beams (which in the example of FIG. 4B is the $+1^{st}$ order light beam). Herein, the second photosensitive element 10b and the fourth photosensitive element 10d include the same number of photosensitive portions as the number (i.e., four) of diffraction regions in the polarization hologram element 7. The third photosensitive element 10c includes two photosensitive portions which respectively receive a $+1^{st}$ order light beam and a $-1^{st}$ order light beam occurring from the polarizing diffraction element 2 out of a sub-beam.

The photosensitive element 10a is divided into four regions A to D, which are arranged so that $0^{th}$ order light derived from the main beam ($0^{th}$ order light from the diffraction element in the forward path and $0^{th}$ order light from the hologram element in the return path) is received near the center thereof. Each region outputs an electrical signal which is in accordance with the received amount of light. When signals which are output from the regions A to D are denoted respectively as A to D, an arithmetic circuit which is included in the photodetector 10 but not shown generates an RF signal through an arithmetic operation as in (eq. 1) below.

$$RF=A+B+C+D \quad (\text{eq. 1})$$

In order to ensure a response which is necessary for generating an RF signal, position of the light-receiving surface of the photosensitive element 10a along the Z direction is set so that the light spot which is formed on the light-receiving surface of the photosensitive element 10a has an adequate size. On the other hand, if the photosensitive element for outputting a signal from which to generate an RF signal is too large, conversely, sufficient frequency characteristics cannot be obtained. Therefore, in the present embodiment, a construction in which the spot of $0^{th}$ order light derived from the main beam on the photosensitive element 10a is defocused by about the distance De (where De is a value in the range from 100 μm to 300 μm) from the convergence point.

Although the photosensitive element 10a for generating an RF signal may have just one region instead of being divided into four regions A to D, a 4-divided construction as shown in FIG. 4B is able to detect a light amount balance along the vertical direction (the Y direction) and the horizontal direction (the X direction) in the figure, and lends itself to the position adjustment of the photosensitive element 10a.

The photosensitive element 10c, indicated as E and F in FIG. 4B, is a photosensitive element for obtaining a read signal with which to realize DRAW. In accordance with the direction of travel of the optical storage medium 6, the photosensitive element 10c receives a sub-beam to form a DRAW spot following the recording spot in either region E or F. The arithmetic circuit of the photodetector 10 not shown compares a signal which is output from the region E or F against the recording signal, thereby performing a verify of the recorded data, simultaneously with the data recording.

[1-2-4. Servo Signal Detection]

Next, detection of servo signals, i.e., a focus signal and a tracking signal, will be described.

From the diffracted light beam which has been diffracted and split by the polarization hologram element 7 having a divided region pattern of the four quadrants R1 to R4 shown in FIG. 4A, light spots D1 to D4 are formed on the respective border lines between regions G and K, regions J and N, regions I and M, regions H and L, which are divided into two in the Y direction. Note that these border lines coincide with a straight line along the X axis direction passing through the light spot (RF spot) of $0^{th}$ order light derived from the main beam.

Herein, the photosensitive portions (the pair of regions G and K and the pair of regions H and L) that receive diffracted light from the regions R1 and R4 of the polarization hologram element 7 are located closer to the photosensitive element 10a for receiving $0^{th}$ order light which travels along the optical axis center of the optical system, whereas the photosensitive portions (the pair of regions J and N and the pair of regions I and M) that receive diffracted light from the regions R2 and R3 are located farther away from the photosensitive element 10a. The reason behind this is as follows. Light which is diffracted from the polarization hologram element 7 once travels while protruding outside relative to the parallel light beam in the forward path; hence, in an optical pickup which needs to be accommodated in a small housing, the light may be intercepted by members such as walls of the housing, optical element holders, and the like. Therefore, light from the regions R2 and R3, which are on the −X direction side of the optical axis center, is allowed to strike the regions I and M and the regions J and N, which are located farther away from the optical axis center toward the +X side; on the other hand, light from the regions R1 and R4, which are on the +X direction side of the optical axis center, is allowed to strike the regions G and K and the regions H and L, which are located closer to the optical axis center. As a result, amounts of loss in the diffracted light from the polarization hologram element 7 can be reduced.

Hereinafter, a method of focus signal detection will be described. The optical pickup according to the present embodiment performs focus signal detection under the SSD method.

Figure 4C:
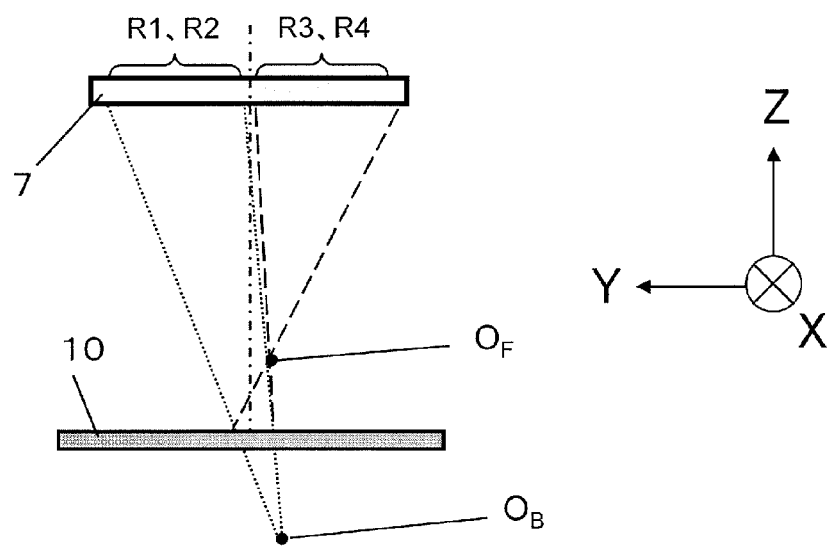
FIG. 4C A diagram schematically showing a light beam diffracted by the polarization hologram element 7 according to Embodiment 1.

FIG. 4C is a diagram schematically showing a light beam (order diffracted light derived from the main beam) which has been diffracted and split by the regions R1 to R4 of the polarization hologram element 7. For simplicity, the collimating lens 4 is omitted from illustration in this figure. As shown in the figure, the pattern of the hologram element 7 is arranged so that light from the regions R1 and R2 arrives at a focal point that is rearward (point $0_B$) of the light-receiving surface of the photodetector 10. Conversely, the pattern of the hologram element 7 is arranged so that light from the regions R3 and R4 arrives at a focal point which is frontward (point $0_F$) of the light-receiving surface of the photodetector 10.

Now, when defocus occurs between the optical storage medium 6 and the objective lens 5, the focal point position changes along the Z direction also at the detection side. For example, if the position of the focal point is moved in the Z+ direction, the light spots D1 and D2 from the regions R1 and R2 become smaller, and conversely, the light spots D3 and D4 from the regions R3 and R4 become larger. On the other hand, if the focal point position moves in the Z-direction, the light spots D1 and D2 from the regions R1 and R2 become larger, and conversely, the light spots D3 and D4 from the regions R3 and R4 become smaller.

Based on such principles of the SSD method, a focus signal FE (SSD) is obtained through an arithmetic operation as in (eq. 2) below. Note that signals representing the received amounts of light in the regions G to H are denoted respectively as G to H.

$$FE(SSD)=(G+L+M+J)-(K+H+I+N) \quad (eq. 2)$$

Now, a case will be considered where a greater lens shift than conventionally is required, as in an optical pickup which is suitable for optical tapes.

The direction of a lens shift is a direction which is orthogonal to the track, that is, the X direction. When a lens shift is made, the light spots D1 to D4 on the detector 10 also shift along the X direction on the light-receiving surface. In other words, the light spots D1 to D4 will move along the X direction, on the border lines between the photosensitive portions (the pair of G and K, the pair of J and N, the pair of I and M, the pair of H and L). Therefore, the focus signal is not affected by the lens shift. In the present embodiment, where the polarization hologram element 7 is located on the path of the parallel light beam after the collimating lens 4, a lens shift will only cause a small amount of shift of the detection light spot anyway.

In the present embodiment, the influence of wavelength fluctuations of outgoing light from the light source 1 is also small. The diffraction angle at the hologram element 7 will change when wavelength fluctuations occur due to pickup-to-pickup variations in the wavelength of outgoing light from the light source 1, changes in the ambient temperature of the pickup or heat generation by the laser itself, and so on. A changing diffraction angle will cause a shift in the detection light spot. However, since a change in the diffraction angle causes a move of the detection light spot substantially along the X direction, the detection light spot will move on the border line of each photosensitive portion, similarly to a lens shift. Therefore, influences on the focus signal due to wavelength fluctuations are small.

Although a displacement along the X direction does not affect the focus signal as is set forth above, a displacement along the Y direction will result in some influence. Therefore, the spot size is to be set so that an adequate "S" sensitivity is obtained, and that deterioration in the focus signal will be small even if a displacement along the Y direction occurs. Specifically, the width of each detection region G to N along the Y direction is designed to be about 0.8 to 1.5 times the radius of the light spot which is formed in each photosensitive portion. Note that, when the light spot shape is a sector shape which is a part of a circle as in the present embodiment, "the radius of a light spot" refers to the radius of that circle.

Although a focus signal by the SSD method is generated in the present embodiment, the focus signal may be generated by other methods, such as the knife-edge method.

Next, a method of tracking signal detection will be described. In the present embodiment, a tracking signal by the CFF method is generated.

In the present embodiment, a tracking signal is also detected by using the same detection regions G to N.

As indicated by a broken line in FIG. 4A, in the polarization hologram element 7, a portion of the diffracted light from the tracking groove is incident in an region which opposes the aperture of the objective lens 5. Therefore, a tracking signal is obtained by calculating a difference between the intensity of light which has passed through R1 and R4 and the intensity of light which has passed through R2 and R3. This means that a tracking signal TE (CFF) is obtained by the detector 10 performing an arithmetic operation of (eq. 3) below.

$$TE(CFF)=(G+H+K+L)-(I+J+M+N) \quad (eq. 3)$$

This arithmetic operation is equivalent to dividing the ray cross section into two at a straight line extending along the Y direction and through the center of aperture $O_1$ of the objective lens 5, and detecting a difference between their respective light amounts. Since a tracking signal is to be obtained through such an arithmetic operation, the polarization hologram element 7 according to the present embodiment is moved integrally with the objective lens 5. As a result, even if a lens shift occurs along the X direction, the light spot on the detector 10 will move inside each of the four photosensitive portions in the photosensitive element 10b, whereby the offset by the lens shift is kept small. Thus, in the present embodiment, the arithmetic circuit of the detector 10 generates a tracking signal by the CFF method, which incurs little offset due to lens shifts.

Next, characteristics of the focus signal and the tracking signal according to the present embodiment with respect to a lens shift will be described.

Figure 5A:
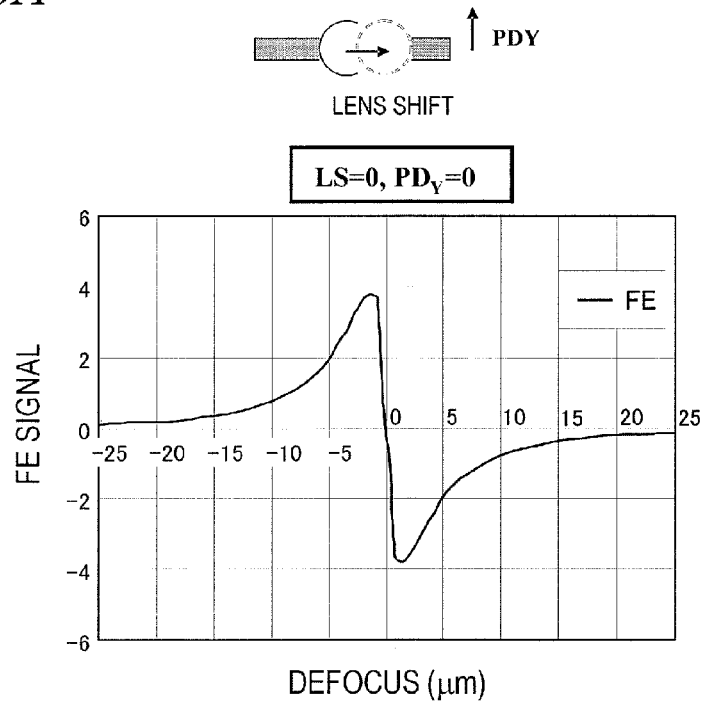
FIG. 5A A diagram showing an FE signal waveform in the case where there is no lens shift in Embodiment 1.
Figure 5B:
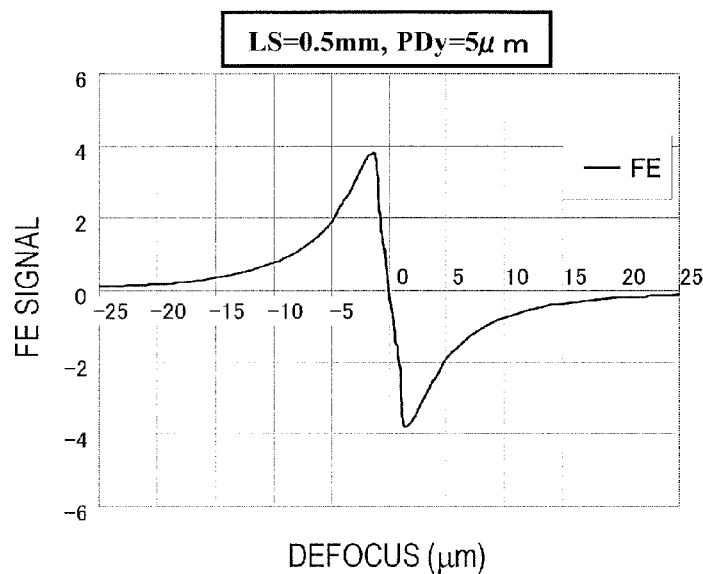
FIG. 5B A diagram showing an FE signal waveform in the case where there is some lens shift in Embodiment 1.

FIGS. 5A and 5B are diagrams showing characteristics of the focus signal with respect to a lens shift. FIG. 5A shows a focus signal waveform with respect to defocus (i.e., displacement of the objective lens from the focus position along the Z direction), in a state where neither a detector displacement nor a lens shift exists. FIG. 5B shows a focus signal waveform where the detector is displaced by 5 µm along the Y direction, along which influence occurs, and furthermore a lens shift of 0.5 mm is made. As indicated by these figures, the "S" curve of the focus signal is hardly affected by the lens shift. As shown in FIG. 5B, according to the present embodiment, the amount of change in the focus balance due to the aforementioned lens shift is reduced to 0.04%, and the amount of change of the focus balance to −0.37%.

Figure 5C:
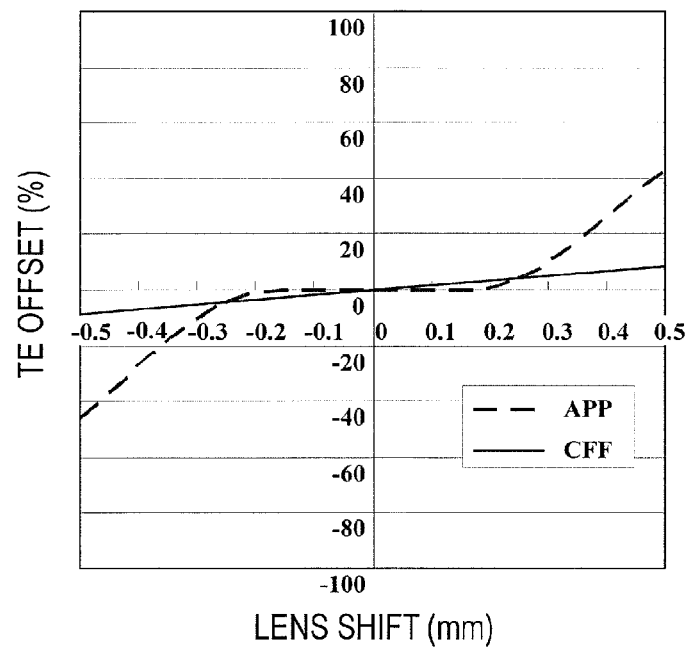
FIG. 5C A diagram showing changes in TE offset relative to the amount of lens shift according to Embodiment 1.
Figure 5D:
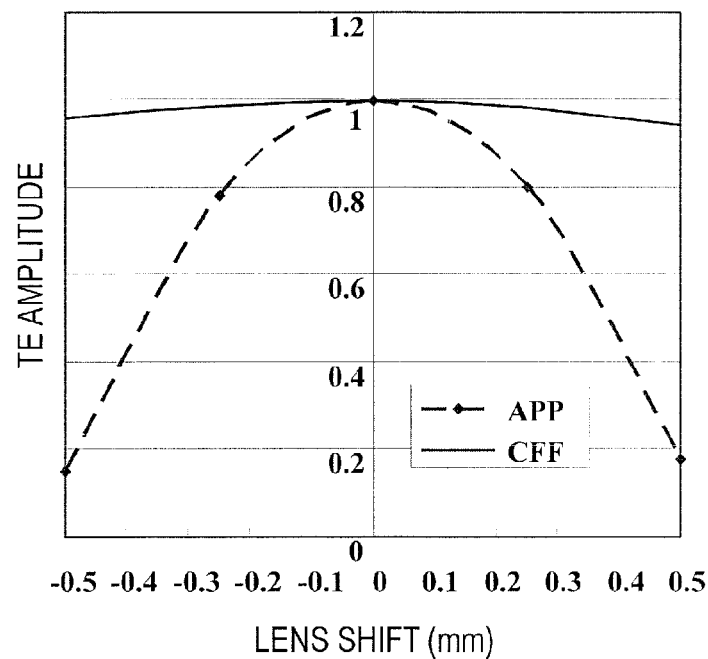
FIG. 5D A diagram showing changes in TE amplitude relative to the amount of lens shift in the optical pickup according to Embodiment 1.

FIGS. 5C and 5D are diagrams showing the characteristics of the tracking signal with respect to a lens shift. FIG. 5C shows dependence of the TE offset on the amount of lens shift (the amount of movement of the objective lens along the X direction from a reference position). FIG. 5D shows dependence of the TE amplitude with respect to the amount of lens shift. The solid lines in the figures represent results according to the present embodiment (CFF method), whereas the broken lines represent results according to the conventional APP method. As is indicated by these results, according to the present embodiment, even if the amount of lens shift exceeds e.g. 0.3 mm, changes in the TE offset and TE amplitude can be kept small.

Furthermore, in the present embodiment, a tracking signal (generally referred to as a DPD signal; Differential Phase Detection signal) by the phase difference method can also be obtained. A tracking signal TE(DPD) by the phase difference method is generated through a phase difference comparison between (G+K+I+M) and (H+J+L+N).

Moreover, with the construction of the present optical pickup, a total of three beams, i.e., a write beam and two DRAW beams, are created in the forward path. Therefore, in the return path, diffractive splitting by the polarization hologram element 7 along the X direction occurs for each of these three beams. In other words, sub-spots corresponding to the detection light spots D1 to D2 for servo occur. The existence of these sub-spots is another advantage coming from arranging the detectors (G to N) which perform the aforementioned focus and tracking detection in a horizontally elongated pattern along the x axis.

In the construction of the present optical pickup, these sub-spots can also be received at the respective photosensitive portions O, P, Q, R, S, T, U, and V in the detector construction shown in FIG. 4B. That is, an offtrack signal of a DRAW beam (sub-beam) can be obtained through the arithmetic operation of (eq. 4) or (eq. 5) below.

$$TE(DRAW1)=(O+P)-(Q+R) \quad \text{(eq. 4)}$$

$$TE(DRAW2)=(S+T)-(U+V) \quad \text{(eq. 5)}$$

Alternatively, for a simpler construction, the photosensitive portions O and P; Q and R; S and T; and U and V may each be made integral.

Thus, in tracking control, which is performed by using a TE signal by the CFF method (eq. 3) based on a detection result concerning the write beam (main beam), the amount of off-tracking can be detected if an off-tracking of the DRAW spot occurs, e.g., when the track direction of an optical tape or the like becomes inclined.

However, care must be taken so that these sub-spots (i.e., spots created on the respective photosensitive portions of the photosensitive element 10d) and the detection light spots for servo (i.e., spots created on the respective photosensitive portions of the photosensitive element 10c) do not act as stray light on each other. Conversely, under a design where the light spot of the main beam and the light spot of the sub-beam are very distant on the detector 10, the main spot and the sub-spot will also be too distant on the recording surface of the storage medium 6. This means a greater aberration of the DRAW spot, and deterioration in their spot quality.

Therefore, given a focal length f1 of the objective lens, a combined focal length f2 of the collimating lens 4 and a detection lens not shown, and an interval d between the light spot of the main beam formed on a track of the storage medium 6 and the light spot of the sub-beam, the distance (=f2/f1×d) between the main spot and the sub-spot on the detector surface is designed so as to satisfy 100 µm<f2/f1<500 µm, for example. More preferably, it may be designed so as to satisfy 80 µm<f2/f1×d<200 µm.

[1-3. Effects and the Like]

Thus, according to the present embodiment, while detecting an RF signal by a write beam and a DRAW signal by a DRAW beam, servo signals which are stable against relatively large lens shifts can be obtained. In addition, an optical pickup having the functions of tracking detection by the phase difference method and off-tracking detection with the DRAW beam can be realized. Since detection of these many kinds of signals can be realized with a very simple detector construction, and the number of signal pins of the detector can be reduced, the flexible substrate and circuitry such as the front-end processor can also be simplified.

Thus, while recording data onto a track of the optical storage medium 6, the optical pickup according to the present embodiment is able to read data that has been recorded on the track. The optical pickup includes a light source 1 which emits a light beam; a diffraction element 2 which separates a light beam emitted from the light source 1 into a plurality of light beams including a write main beam and a read sub-beam; an objective lens 5 configured to converge the main beam and sub-beam onto the same track on the optical storage medium 6; a ¼ wavelength plate 9 disposed on an optical path from the diffraction element 2 to the optical storage medium 6; a polarization hologram element disposed between the diffraction element 2 and the wavelength plate 9; an actuator 11 which integrally drives the polarization hologram element 7, the ¼ wavelength plate 9, and the objective lens 5 for focus control and tracking control; and a photodetector 10 configured to detect a light beam which has been reflected from the optical storage medium 6 and diffracted by the polarization hologram element 7. The ¼ wavelength plate 9 is designed so that the polarization direction of the light entering which is incident from the diffraction element 2 onto the wavelength plate 9 is orthogonal to the polarization direction of the light which is reflected from the optical storage medium 6 and again transmitted through the wavelength plate 9. The polarization hologram element 7 has four diffraction regions R1 to R4 with different diffraction characteristics, each diffraction region being designed so as to separate a light beam which has been reflected from the optical storage medium 6 and transmitted through the wavelength plate 9 into a $0^{th}$ order light beam and $\pm1^{st}$ order light beams. The photodetector 10 generates an RF signal from a detection result concerning the $0^{th}$ order light beam derived from the main beam, generates a focus error signal and a tracking error signal from a detection result concerning one of the $\pm1^{st}$ order light beams derived from the main beam, and generates a signal indicating that data has been recorded normally from a detection result concerning the $0^{th}$ order light beam derived from the sub-beam.

In the present embodiment, in particular, the polarization hologram element 7 is divided into four diffraction regions around a center which is a point traveled by a central portion of the main beam, the division being made by a straight line in the same direction (the Y direction) as a track on the optical storage medium 6 and a straight line in a perpendicular direction (the X direction) to the track. Moreover, the photodetector includes a first photosensitive element 10a for detecting a $0^{th}$ order light beam derived from the main beam, a second photosensitive element 10b for detecting one of a $+1^{st}$ order light beam and a $-1^{st}$ order light beam derived from the main beam, and a third photosensitive element 10c for detecting a $0^{th}$ order light beam derived from the sub-beam. The second photosensitive element 10b includes the same number, i.e., four, of photosensitive portions as the number of diffraction regions of the polarization hologram element 7, these being arranged so that each photosensitive portion receives either one of the $±1^{st}$ order diffracted light occurring from one of the diffraction regions. The first photosensitive element 10a and the photosensitive portions of the second photosensitive element 10b are arranged along the same direction as the direction in which a light spot on the photodetector 10 moves when the objective lens 5 shifts in a direction (the X direction) perpendicular to the track direction on the optical storage medium 6. Then, the photodetector 10 generates a tracking error signal by the correct far field method, and generates a focus error signal by the spot size detection method.

As a result, stable servo signals can be obtained, relative to any conventional construction which generates a focus error signal and a tracking error signal by utilizing detection results concerning both of the $±1^{st}$ order light beams derived from the main beam. In particular, even if the objective lens 5 significantly shifts along a direction (the X direction) perpendicular to the track, stable servo signals can still be generated.

[1-4. Variant]

Next, the concept behind the detector pattern will be described. The following detector pattern may be adopted as necessary.

Figure 6A:
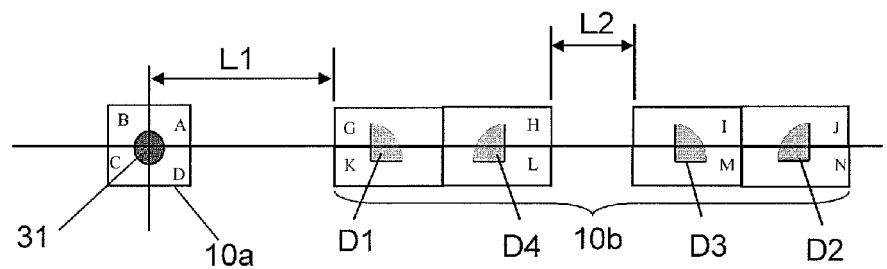
FIG. 6A A diagram showing how a light spot may appear on the detector, in a focused state in Embodiment 1.
Figure 6B:
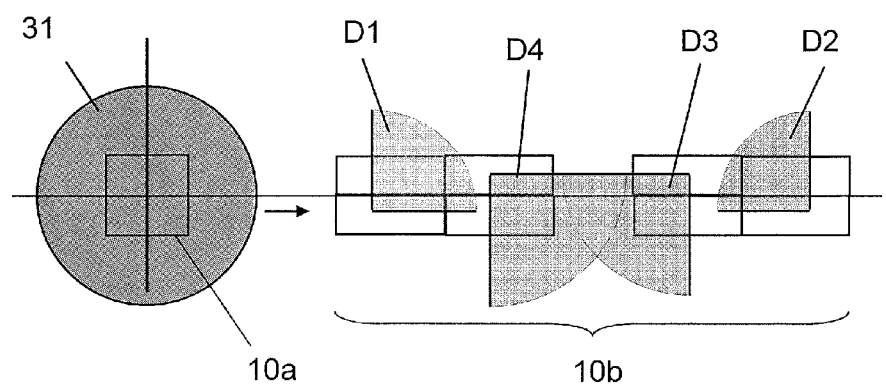
FIG. 6B A diagram showing how a light spot may appear on the detector, in a defocused state in Embodiment 1.

FIGS. 6A and 6B are diagrams showing a variant of the photodetector 10. In this variant, the photosensitive element 10a and the photosensitive element 10b are spaced by a distance L1; within the photosensitive element 10b, too, the two inner photosensitive portions are spaced by a distance L2. FIG. 6A shows a detection light spot in a focused state, and FIG. 6B shows a detection light spot in a defocused state. As shown in FIG. 6B, a light spot 31 of the main beam, from which an RF signal is to be generated, expands in a defocused state. If the interspace between the photosensitive element 10a and the photosensitive element 10b were short, this light spot would also stray into the photosensitive element 10b for detecting an FE signal and a TE signal.

Generally speaking, a summed focus signal (Fsum signal) is often used for determining a state where focus control is disengaged (misfocusing) in an optical recording/reproduction apparatus. If a large amount of $0^{th}$ order light travels into an FE detector due to defocus, the Fsum signal will be significantly affected, thus resulting in an incorrect detection of misfocusing.

Therefore, in the exemplary construction shown in FIGS. 6A and 6B, the photosensitive element 10b for detecting an FE signal is placed away from the position of the $0^{th}$ order light by the distance L1. The radius RA of the $0^{th}$ order light in a defocused state is expressed by (eq. 6) below, assuming a numerical aperture NA of the objective lens, a focal length fo of the objective lens, a focal length fc of the collimating lens (or, if another detection lens is included a combined focal length therewith), and a difference D between the focal point position of the collimating lens and the detector surface.

$$RA = NA \times fo \times (D+\Delta Z)/(fc+\Delta Z) \quad \text{(eq. 6)}$$

$\Delta Z$ represents the amount of movement of a convergence point of the collimating lens relative to the amount of defocus df, as expressed by (eq. 7).

$$\Delta Z = 2 \times (fc/fo)2 \times df \quad \text{(eq. 7)}$$

Generally speaking, in a system which performs recording/reproduction with light, the light amount of an Fsum signal will be sufficiently low when there is a defocus of about 10 μm or more. Therefore, assuming a radius RA1 of the $0^{th}$ order light spot under a defocus of 10 μm, L1 may be determined so as to satisfy the relationship of (eq. 8), whereby the influence can be reduced.

$$L1 > RA1 \quad \text{(eq. 8)}$$

Furthermore, in the example shown in FIG. 6A, the interspace L2 is also provided between the two photosensitive portions which respectively receive the spots D4 and D3 of detection light (i.e., the pair of H and L and the pair of I and M). This is in order to prevent light amount changes from being superposed on the FE signal, such light amount changes being caused by interference of spots between detection light D2 and D3 in a defocused state. Note that the photosensitive portions of the photosensitive element 10b may be distanced by spaces so that a light spot formed on each photosensitive portion does not overlap another photosensitive portion, whereby the signal quality can be further improved.

Thus, with the construction of FIGS. 6A and 6B, an optical pickup with a more stable misfocusing detection operation and FE signal quality in a defocused state can be realized.

Embodiment 2

Next, Embodiment 2 of the present disclosure will be described. The optical pickup according to the present embodiment is identical to that of Embodiment 1 except for the construction of the photodetector 10.

Figure 7A:
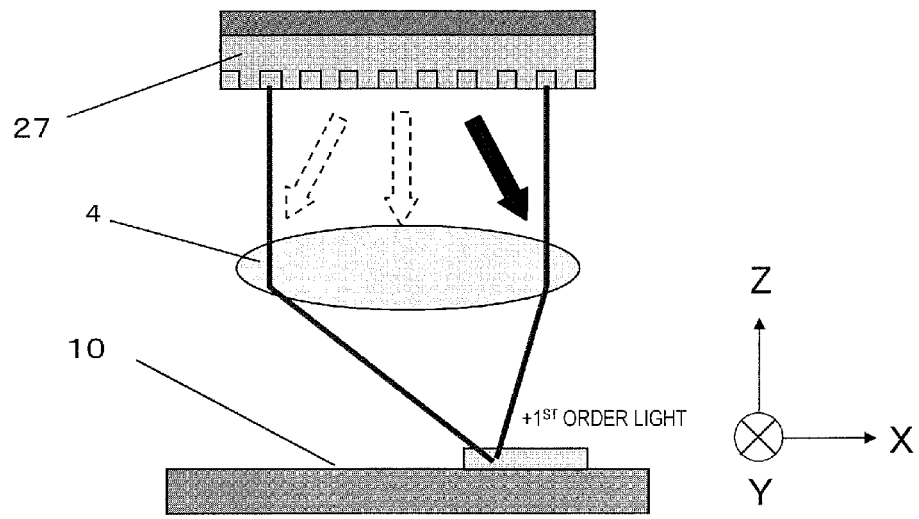
FIG. 7A A diagram showing diffraction of light by a polarization hologram element 27 and a spot on the light-receiving surface of a detector 10 according to Embodiment 2.
Figure 7B:
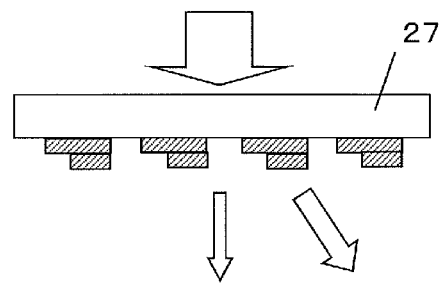
FIG. 7B A cross-sectional view of the polarization hologram element 27 according to Embodiment 2.
Figure 7C:
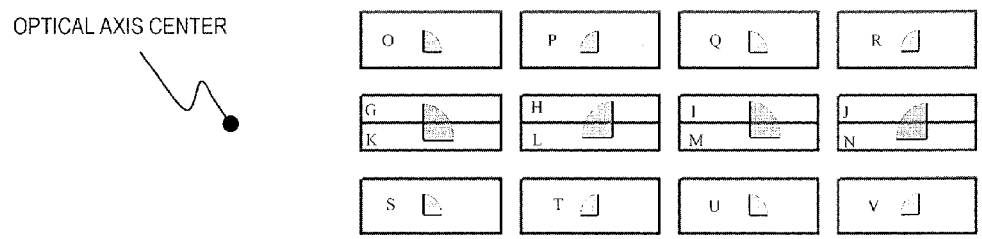
FIG. 7C A diagram showing an exemplary detector pattern according to Embodiment 2.

FIG. 7A is a schematic construction diagram of the detection system according to the present embodiment; FIG. 7B is a schematic cross-sectional view of a polarization hologram element 27 according to the present embodiment; and FIG. 7C is a diagram showing a detector pattern according to the present embodiment.

As shown in FIG. 7A, in the present embodiment, an RF signal is detected based on $+1^{st}$ order light derived from the main beam, similarly to servo signals, rather than being detected based on $0^{th}$ order light derived from the main beam (write beam). In order to maintain the S/N ratio of the RF signal, a blazed-type polarization hologram element 27 having a periodic structure with an asymmetric cross section as shown in FIG. 7B is used. This allows the diffraction efficiency of $+1^{st}$ order light to be the highest, so that most of the light can be received by the detector shown in FIG. 7C.

An RF signal in the present embodiment can be obtained according to (eq. 9) below.

$$RF = G+H+M+N+K+L+I+J \quad \text{(eq. 9)}$$

Moreover, a read signal RF (DRAW1) based on a DRAW beam can be obtained by (eq. 10) or (eq. 11) below.

$$RF(DRAW1) = O+P+Q+R \quad \text{(eq. 10)}$$

$$RF(DRAW2) = S+T+U+V \quad \text{(eq. 11)}$$

In other words, according to the present embodiment, the detector construction is further simplified, and the light amount of $0^{th}$ order light is small, thus being able to solve the problem of influences on the Fsum signal that has been described with reference to FIGS. 6A and 6B.

In the present embodiment, too, it is not necessary to adopt straightforward four-divided regions for the polarization hologram element 27. Moreover, the detection light spot size may be varied between the X and Y directions by additionally introducing an astigmatic component to the convergence by the polarization hologram element 27.

Thus, in the present embodiment, the polarization hologram element 27 and the photodetector 10 are different in construction from those in Embodiment 1. The photodetector 10 in the present embodiment is constructed so as to detect a light beam which has been reflected by the optical storage medium 6 and diffracted by the polarization hologram element 27. An RF signal, a focus error signal, and a tracking error signal can be generated from a detection result concerning one of the $\pm 1^{st}$ order light beams derived from the main beam, and a signal (DRAW signal) indicating that data has been recorded normally can be generated from a detection result concerning the $0^{th}$ order light beam derived from the sub-beam.

Embodiment 3

Next, with reference to FIG. 8, Embodiment 3 of the optical recording/reproduction apparatus will be described. Although the optical recording/reproduction apparatus shown in FIG. 8 is an optical disc apparatus, the optical recording/reproduction apparatus according to the present disclosure is not limited to an optical disc apparatus, but may also be an optical tape apparatus, for example.

The optical disc apparatus shown in the figure includes an optical pickup 900, a disc motor 902 which rotates an optical disc (optical storage medium) 8, and a control circuit 1000 which performs various signal processing. The optical pickup 900 is one of the optical pickups in the above-described embodiments. The control circuit 1000 has functional blocks such as a front-end signal processing section 906, a servo control section 910, an encoder/decoder 908, a CPU 909, and the like.

Figure 8:
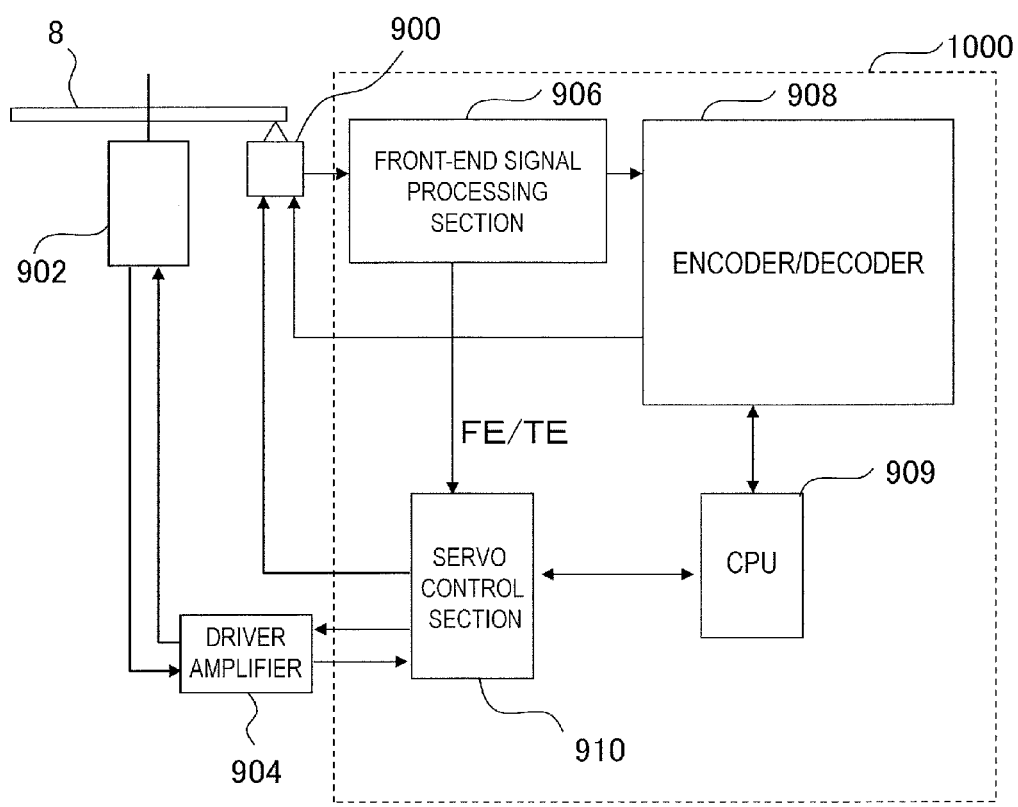
FIG. 8 A diagram showing a schematic construction of an optical recording/reproduction apparatus according to Embodiment 3.

In the exemplary construction shown in FIG. 8, the output from the optical pickup 900 is sent to the encoder/decoder 908 via the front-end signal processing section 906. During a data read, the encoder/decoder 908 decodes data that is recorded on the optical disc 8, based on a signal which is obtained with the optical pickup 900. During a data write, the encoder/decoder 908, which includes an optical modulation circuit, encodes data, generates a signal to be written to the optical disc 8, and sends the signal to the optical pickup 900. With this signal, the intensity of the light beam is modulated so that desired recorded marks will be formed.

While generating a read signal based on the output from the optical pickup 900, the front-end signal processing section 906 generates a focus error signal FE and a tracking error signal TE. The focus error signal FE and the tracking error signal TE are sent to the servo control section 910. The servo control section 910 controls the disc motor 902 via a driver amplifier 904, and also controls the position of the objective lens via an actuator in the optical pickup 900. Constituent elements such as the encoder/decoder 908 and the servo control section 910 are controlled by the CPU 909.

While recording data onto a predetermined track of the optical storage medium 8, the front-end signal processing section 906 and the encoder/decoder 908 are able to read recorded marks that have been formed on the track, based on the output from the optical pickup device 900. Through this, while data is being recorded, that data can also be verified. In the present embodiment, the front-end signal processing section 906 and the encoder/decoder 908 cooperate to realize the functions of the processing section(s) of the optical recording/reproduction apparatus according to the present invention.

The optical recording/reproduction apparatus of the present embodiment includes one optical pickup 900; however, it may include two or more optical pickups 900. The respective optical pickups may be adapted to simultaneously record data on different tracks on the optical storage medium, which will be useful in terms of making recording and verify faster.

A construction similar to that of FIG. 8 may be applied to an optical tape apparatus, instead of an optical disc apparatus. A main difference between an optical tape apparatus and an optical disc apparatus is the driving mechanism for the optical storage medium. In the case where an optical tape is used as the optical storage medium, a plurality of rollers for running the optical tape are employed. Moreover, when provided with a plurality of optical pickups, an optical tape apparatus can simultaneously perform recording or reproduction of data for a plurality of tracks on an optical tape.

Other Embodiments

Thus, Embodiments 1 to 3 have been illustrated as examples of the technique disclosed in the present application. However, the technique according to the present disclosure is not limited thereto, but also is applicable to embodiments with changes, substitutions, additions, omissions, etc., being made as appropriate. It is also possible to combine the individual constituent elements described in Embodiments 1 to 3 into a new embodiment.

Accordingly, other embodiments will be illustrated below.

Figure 9A:
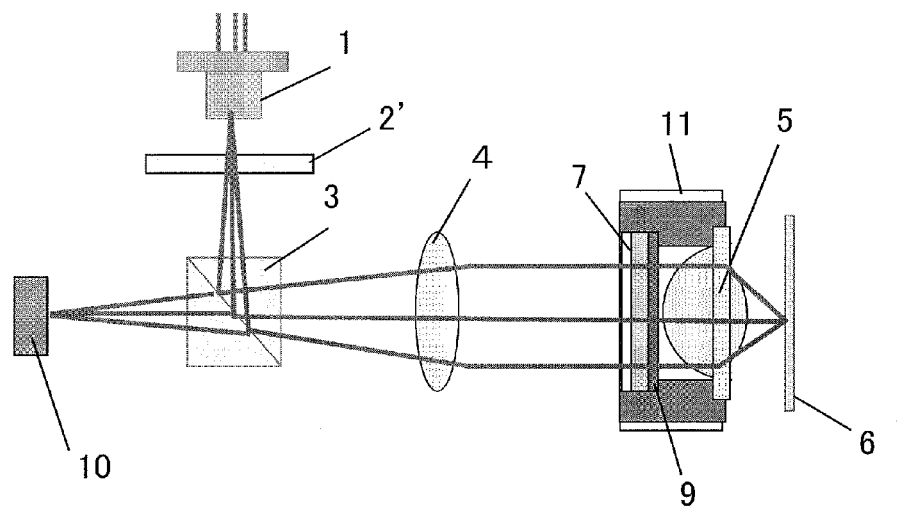
FIG. 9A A diagram showing a schematic construction of an optical pickup according to another embodiment.
Figure 9A:
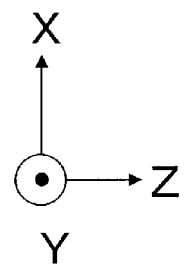

FIG. 9A is a diagram showing an embodiment where, instead of the polarization-type diffraction element 2 in Embodiment 1, a diffraction element 2' which is without polarization property is provided between the light source 1 and the polarization beam splitter 3. Otherwise, the construction is similar to that of Embodiment 1. In this exemplary construction, the diffraction element 2' is provided before the polarization beam splitter 3, so that the diffraction element 2' does not need to any polarization property. Such a construction will also provide similar effects, without deviating from the operation of Embodiment 1.

Figure 9B:
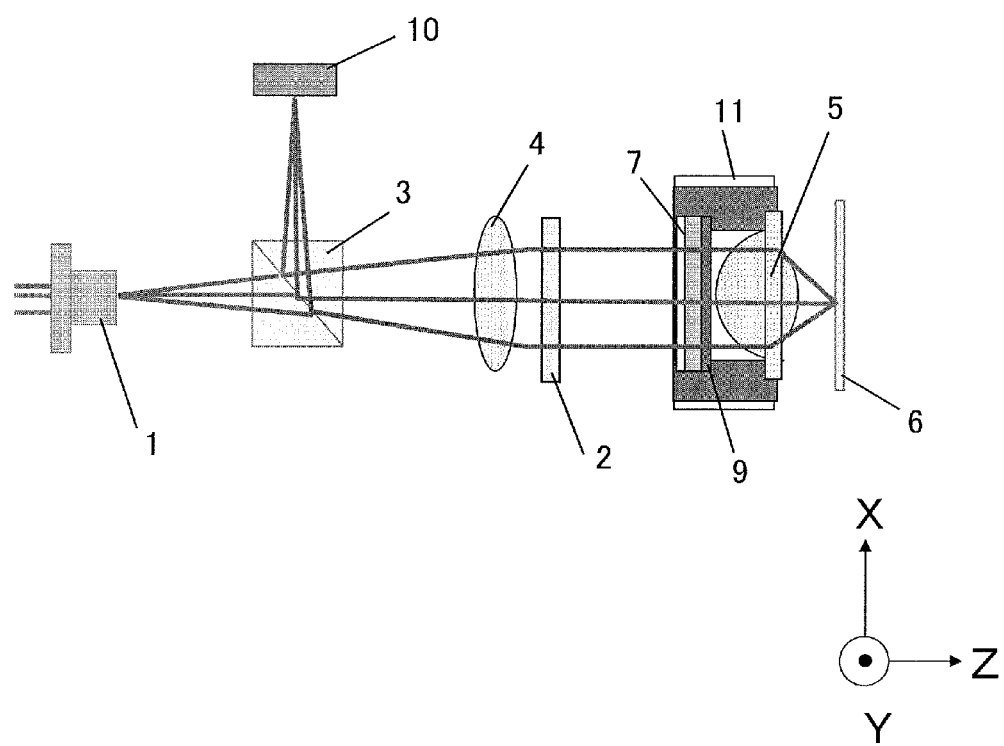
FIG. 9B A diagram showing a schematic construction of an optical pickup according to still another embodiment.

Other than the aforementioned example, the construction of the optical system may be altered within possible ranges. For example, as shown in FIG. 9B, relative positioning of the laser light source 1 and the photodetector 10 in the construction of FIG. 1A may be reversed. In this case, entirely the same discussion will apply mutatis mutandis, by interpreting the photosensitive element arrangement on the photodetector 10 so that the X direction in the above description reads the Z direction and that the Z direction reads the −X direction.

Thus, embodiments have been described as ways of exemplifying the technique according to the present disclosure, and the attached drawings and detailed description have been provided for that purpose.

Therefore, the constituent elements which are described in the attached drawings and detailed description may include not only those constituent elements which are essential to solving the problems, but also those constituent elements which are not essential for solving the problems but help in illustrating the technique. Thus, just because those non-essential constituent elements are described in the attached drawings and detailed description, one should not assume that those non-essential constituent elements are actually essential.

Moreover, the above embodiments are to illustrate the technique of the present disclosure, and therefore are subject to various changes, substitutions, additions, omissions, etc., within the scope of claims and equivalents thereof.

INDUSTRIAL APPLICABILITY

The optical pickup according to the present disclosure can be used, for example, in a bulk information storage system that includes a plurality of them (e.g., a data file system in which optical tapes or optical discs are used), for the purpose of accurately recording information simultaneously in different regions of an optical storage medium, or on different optical storage media. It is also applicable to a generic optical recording/reproduction apparatus. The optical pickup according to the present disclosure is useful as a recording/reproduction apparatus having cost advantages with a simple construction.

REFERENCE SIGNS LIST 1 semiconductor laser light source
2 polarization-type diffraction element
2' diffraction element
3 polarization beam splitter
4 collimating lens
5 objective lens
6,8 optical storage medium
9 ¼ wavelength plate
7,17,27 polarization-type hologram element
10 photodetector
11 actuator
100 recording spot
110 DRAW spot
130 recording track
900 optical pickup
902 disc motor
904 driver amplifier
906 front-end signal processing section
908 encoder/decoder
909 CPU
910 servo control section
1000 control circuit

The invention claimed is:

1. An optical pickup for, while recording data onto a track of an optical storage medium, reading data that has been recorded on the track, comprising:
  a light source for emitting a light beam;
  a diffraction element for separating the light beam emitted from the light source into a plurality of light beams including a write main beam and a read sub-beam;
  an objective lens configured to converge the main beam and the sub-beam onto a same track on the optical storage medium;
  a wavelength plate disposed on an optical path from the diffraction element to the optical storage medium, the wavelength plate being designed so that a polarization direction of light which is incident from the diffraction element onto the wavelength plate is orthogonal to a polarization direction of light reflected from the optical storage medium and transmitted through the wavelength plate;
  a polarization hologram element having a plurality of diffraction regions with different diffraction characteristics, designed so that each diffraction region separates a light beam reflected from the optical storage medium and transmitted through the wavelength plate into a $0^{th}$ order light beam and $\pm 1^{st}$ order light beams;
  an actuator for integrally driving the objective lens and the polarization hologram element for focus control and tracking control; and
  a photodetector configured to detect a light beam reflected from the optical storage medium and diffracted by the polarization hologram element, the photodetector generating an RF signal from a detection result concerning a $0^{th}$ order light beam derived from the main beam, generating a focus error signal and a tracking error signal from a detection result concerning one of $\pm 1^{st}$ order light beams derived from the main beam, and generating a signal indicating that data has been recorded normally from a detection result concerning a $0^{th}$ order light beam derived from the sub-beam,
  wherein the plurality of diffraction regions of the polarization hologram element are four regions divided around a center which is a point traveled by a central portion of the main beam, the division being made by a straight line in a same direction as a track of the optical storage medium and a straight line in a perpendicular direction to the track.

2. An optical pickup for, while recording data onto a track of an optical storage medium, reading data that has been recorded on the track, comprising:
  a light source for emitting a light beam;
  a diffraction element for separating the light beam emitted from the light source into a plurality of light beams including a write main beam and a read sub-beam;
  an objective lens configured to converge the main beam and the sub-beam onto a same track on the optical storage medium;
  a wavelength plate disposed on an optical path from the diffraction element to the optical storage medium, the wavelength plate being designed so that a polarization direction of light which is incident from the diffraction element onto the wavelength plate is orthogonal to a polarization direction of light reflected from the optical storage medium and transmitted through the wavelength plate;
  a polarization hologram element having a plurality of diffraction regions with different diffraction characteristics, designed so that each diffraction region separates a light beam reflected from the optical storage medium and transmitted through the wavelength plate into a $0^{th}$ order light beam and $\pm 1^{st}$ order light beams;
  an actuator for integrally driving the objective lens and the polarization hologram element for focus control and tracking control; and
  a photodetector configured to detect a light beam reflected from the optical storage medium and diffracted by the polarization hologram element, the photodetector generating an RF signal from a detection result concerning a $0^{th}$ order light beam derived from the main beam, generating a focus error signal and a tracking error signal from a detection result concerning one of $\pm 1^{st}$ order light beams derived from the main beam, and generating a signal indicating that data has been recorded normally from a detection result concerning a $0^{th}$ order light beam derived from the sub-beam,
  wherein the photodetector generates the tracking error signal by a correct far field method and generates the focus error signal by a spot size detection method.

3. The optical pickup of claim 2, wherein the photodetector further generates a tracking error signal by a phase difference method from a detection result concerning the one of the $\pm 1^{st}$ order light beams derived from the main beam.

4. An optical pickup for, while recording data onto a track of an optical storage medium, reading data that has been recorded on the track, comprising:
    a light source for emitting a light beam;
    a diffraction element for separating the light beam emitted from the light source into a plurality of light beams including a write main beam and a read sub-beam;
    an objective lens configured to converge the main beam and the sub-beam onto a same track on the optical storage medium;
    a wavelength plate disposed on an optical path from the diffraction element to the optical storage medium, the wavelength plate being designed so that a polarization direction of light which is incident from the diffraction element onto the wavelength plate is orthogonal to a polarization direction of light reflected from the optical storage medium and transmitted through the wavelength plate;
    a polarization hologram element having a plurality of diffraction regions with different diffraction characteristics, designed so that each diffraction region separates a light beam reflected from the optical storage medium and transmitted through the wavelength plate into a $0^{th}$ order light beam and $\pm 1^{st}$ order light beams;
    an actuator for integrally driving the objective lens and the polarization hologram element for focus control and tracking control; and
    a photodetector configured to detect a light beam reflected from the optical storage medium and diffracted by the polarization hologram element, the photodetector generating an RF signal from a detection result concerning a $0^{th}$ order light beam derived from the main beam, generating a focus error signal and a tracking error signal from a detection result concerning one of $\pm 1^{st}$ order light beams derived from the main beam, and generating a signal indicating that data has been recorded normally from a detection result concerning a $0^{th}$ order light beam derived from the sub-beam,
    wherein,
    the photodetector includes
    a first photosensitive element for detecting a $0^{th}$ order light beam derived from the main beam,
    a second photosensitive element for detecting one of the $+1^{st}$ order light beam and the $-1^{st}$ order light beam derived from the main beam, the second photosensitive element having a same number of photosensitive portions as the number of diffraction regions of the polarization hologram element, and
    a third photosensitive element for detecting a $0^{th}$ order light beam derived from the sub-beam; and
    the first photosensitive element and the photosensitive portions of the second photosensitive element are arranged along a same direction as a direction in which a light spot on the photodetector moves when the objective lens shifts in a direction perpendicular to a track direction of the optical storage medium.

5. The optical pickup of claim 4, wherein each photosensitive portion of the second photosensitive element is divided into two equal portions along a first direction corresponding to the track direction of the optical storage medium, each divided portion having a width along the first direction that is 0.8 to 1.5 times a radius of a light spot formed on the photosensitive portion.

6. The optical pickup of claim 4, wherein the photodetector is configured so that the first photosensitive element is displaced from a convergence point of the $0^{th}$ order light beam derived from the main beam by a distance in the range from 100 µm to 300 µm.

7. The optical pickup of claim 4, wherein the first photosensitive element and the second photosensitive element are distanced by a space so that a light spot formed on the first photosensitive element does not overlap any photosensitive portion of the second photosensitive element.

8. The optical pickup of claim 4, wherein the photosensitive portions of the second photosensitive element are distanced by spaces so that a light spot formed on each photosensitive portion does not overlap another photosensitive portion.

9. The optical pickup of claim 4, wherein the plurality of diffraction regions of the polarization hologram element are four regions divided around a center which is a point traveled by a central portion of the main beam, the division being made by a straight line in a same direction as a track of the optical storage medium and a straight line in a perpendicular direction to the track; and
    in the second photosensitive element, among the light spots formed on each photosensitive portion, a space is provided between two light spots coming close to overlap each other due to a move of the objective lens along a focus direction portion.

10. An optical pickup for, while recording data onto a track of an optical storage medium, reading data that has been recorded on the track, comprising:
    a light source for emitting a light beam;
    a diffraction element for separating the light beam emitted from the light source into a plurality of light beams including a write main beam and a read sub-beam;
    an objective lens configured to converge the main beam and the sub-beam onto a same track on the optical storage medium;
    a wavelength plate disposed on an optical path from the diffraction element to the optical storage medium, the wavelength plate being designed so that a polarization direction of light which is incident from the diffraction element onto the wavelength plate is orthogonal to a polarization direction of light reflected from the optical storage medium and transmitted through the wavelength plate;
    a polarization hologram element having a plurality of diffraction regions with different diffraction characteristics, designed so that each diffraction region separates a light beam reflected from the optical storage medium and transmitted through the wavelength plate into a $0^{th}$ order light beam and $\pm 1^{st}$ order light beams;
    an actuator for integrally driving the objective lens and the polarization hologram element for focus control and tracking control; and
    a photodetector configured to detect a light beam reflected from the optical storage medium and diffracted by the polarization hologram element, the photodetector generating an RF signal from a detection result concerning a $0^{th}$ order light beam derived from the main beam, generating a focus error signal and a tracking error signal from a detection result concerning one of $\pm 1^{st}$ order light beams derived from the main beam, and generating a signal indicating that data has been recorded normally from a detection result concerning a $0^{th}$ order light beam derived from the sub-beam, further comprising a collimating lens and a detection lens between the polarization hologram element and the photodetector, wherein $$100\ \mu m < f2/f1 \times d < 500\ \mu m$$

is satisfied, where f1 is a focal length of the objective lens; f2 is a combined focal length of the collimating lens and the detection lens; and d is an interval between a light spot by the main beam formed on the track of the optical storage medium and a light spot by the sub-beam.

* * * * *